United States Patent
Choi et al.

(10) Patent No.: US 11,149,218 B2
(45) Date of Patent: Oct. 19, 2021

(54) INTEGRATED SUPERCRITICAL WATER AND STEAM CRACKING PROCESS

(71) Applicant: Saudi Arabian Oil Company, Dhahran (SA)

(72) Inventors: Ki-Hyouk Choi, Dhahran (SA); Abdullah T. Alabdulhadi, Dhahran (SA); Gonzalo Feijoo Martinez, Dhahran (SA); Ali M. Alsomali, Dhahran (SA); Mohammad A. Alabdullah, Dhahran (SA); Essam A. Al-Sayed, Al-Khobar (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 15/930,337

(22) Filed: May 12, 2020

(65) Prior Publication Data
US 2020/0270535 A1 Aug. 27, 2020

Related U.S. Application Data

(62) Division of application No. 15/920,099, filed on Mar. 13, 2018, now Pat. No. 10,703,999.
(Continued)

(51) Int. Cl.
*B01J 3/00* (2006.01)
*B01J 19/18* (2006.01)
(Continued)

(52) U.S. Cl.
CPC .............. *C10G 69/06* (2013.01); *B01J 3/00* (2013.01); *B01J 3/008* (2013.01); *C10G 9/36* (2013.01);
(Continued)

(58) Field of Classification Search
CPC ......... C10G 69/06; C10G 51/02; C10G 53/02
See application file for complete search history.

(56) References Cited

U.S. PATENT DOCUMENTS 2,733,192 A 1/1956 Sage
2,880,171 A 3/1959 Flinn et al.
(Continued)

FOREIGN PATENT DOCUMENTS

CN 1508221 A 6/2004
CN 101553553 A 10/2009
(Continued)

OTHER PUBLICATIONS

Cheng et al. (Effects of supercritical water in vacuum residue upgrading, 2009, Energy and Fuels, vol. 23, pp. 3178-3183, see p. 3178, 1. Introduction). (Year: 2009).*
(Continued)

*Primary Examiner* — Youngsul Jeong
(74) *Attorney, Agent, or Firm* — Bracewell LLP; Constance Gall Rhebergen

(57) ABSTRACT

A method for producing a supercritical water (SCW)-treated product is provided. The method comprising the steps of introducing a crude oil stream and a water stream to a supercritical water process, wherein the crude oil stream can undergo conversion reactions to produce the supercritical water (SCW)-treated product, wherein the SCW-treated product includes an increased paraffin concentration as compared to crude oil stream. The method further includes the step of introducing the SCW-treated product to a steam cracking process, wherein the SCW-treated product can undergo conversion reactions to produce furnace effluent.

18 Claims, 9 Drawing Sheets

Related U.S. Application Data

(60) Provisional application No. 62/471,016, filed on Mar. 14, 2017.

(51) Int. Cl.
*C10G 69/06* (2006.01)
*C10G 53/02* (2006.01)
*C10G 9/36* (2006.01)
*C10G 51/02* (2006.01)
*C10G 55/04* (2006.01)
*C10G 31/08* (2006.01)

(52) U.S. Cl.
CPC ........... *C10G 31/08* (2013.01); *C10G 51/023* (2013.01); *C10G 53/02* (2013.01); *C10G 55/04* (2013.01); *B01J 19/18* (2013.01); *B01J 2219/00006* (2013.01)

(56) References Cited

U.S. PATENT DOCUMENTS

| | | |
|---|---|---|
| 2,944,012 A | 7/1960 | Thompson |
| 2,967,204 A | 1/1961 | Beuther et al. |
| 3,116,234 A | 12/1963 | Douwes et al. |
| 3,377,267 A | 4/1968 | Spars |
| 3,501,396 A | 3/1970 | Gatsis |
| 3,576,596 A | 4/1971 | Kranc et al. |
| 3,586,621 A | 6/1971 | Pitchford et al. |
| 3,654,139 A | 4/1972 | Winsor et al. |
| 3,690,706 A | 9/1972 | Boik et al. |
| 3,702,292 A | 11/1972 | Burich |
| 3,708,421 A | 1/1973 | Rippie |
| 3,733,259 A | 5/1973 | Wilson et al. |
| 3,830,752 A | 8/1974 | Mickelson |
| 3,836,594 A | 9/1974 | Sampson |
| 3,842,014 A | 10/1974 | Friend et al. |
| 3,864,451 A | 2/1975 | Lee et al. |
| 3,898,299 A | 8/1975 | Jones |
| 3,948,754 A | 4/1976 | McCollum et al. |
| 3,948,755 A | 4/1976 | McCollum et al. |
| 3,960,706 A | 6/1976 | McCollum et al. |
| 3,960,708 A | 6/1976 | McCollum et al. |
| 3,988,238 A | 10/1976 | McCollum et al. |
| 3,989,618 A | 11/1976 | McCollum et al. |
| 4,005,005 A | 1/1977 | McCollum et al. |
| 4,082,695 A | 4/1978 | Rosinski et al. |
| 4,151,068 A | 4/1979 | McCollum et al. |
| 4,203,829 A | 5/1980 | Bertolacini |
| 4,210,628 A | 7/1980 | Ninomiya et al. |
| 4,325,926 A | 4/1982 | Blanton, Jr. |
| 4,464,252 A | 8/1984 | Eberly, Jr. et al. |
| 4,483,761 A | 11/1984 | Paspek, Jr. |
| 4,485,007 A | 11/1984 | Tam et al. |
| 4,530,755 A | 7/1985 | Ritchie et al. |
| 4,544,481 A | 10/1985 | Seiver et al. |
| 4,571,295 A | 2/1986 | Forte |
| 4,594,141 A | 6/1986 | Paspek, Jr. et al. |
| 4,719,000 A | 1/1988 | Beckberger |
| 4,743,357 A | 5/1988 | Patel et al. |
| 4,762,814 A | 8/1988 | Parrott et al. |
| 4,818,370 A | 4/1989 | Gregoli et al. |
| 4,822,497 A | 4/1989 | Hong et al. |
| 4,840,725 A | 6/1989 | Paspek |
| 4,908,122 A | 3/1990 | Frame et al. |
| 5,087,350 A | 2/1992 | Paris-Marcano |
| 5,096,567 A | 3/1992 | Paspek et al. |
| 5,167,797 A | 12/1992 | Ou |
| 5,278,138 A | 1/1994 | Ott et al. |
| 5,316,659 A | 5/1994 | Brons et al. |
| 5,411,658 A | 5/1995 | Chawla et al. |
| 5,421,854 A | 6/1995 | Kodas et al. |
| 5,439,502 A | 8/1995 | Kodas et al. |
| 5,466,363 A | 11/1995 | Auden et al. |
| 5,496,464 A | 3/1996 | Piskorz et al. |
| 5,529,968 A | 6/1996 | Sudhakar et al. |
| 5,538,930 A | 7/1996 | Sudhakar et al. |
| 5,558,783 A | 9/1996 | McGuinness |
| 5,560,823 A | 10/1996 | Whiting |
| 5,597,476 A | 1/1997 | Hearn et al. |
| 5,611,915 A | 3/1997 | Siskin et al. |
| 5,616,165 A | 4/1997 | Glicksman et al. |
| 5,626,742 A | 5/1997 | Brons et al. |
| 5,676,822 A | 10/1997 | Sudhakar |
| 5,695,632 A | 12/1997 | Brons et al. |
| 5,837,640 A | 11/1998 | Sudhakar et al. |
| 5,851,381 A | 12/1998 | Tanaka et al. |
| 5,861,136 A | 1/1999 | Glicksman |
| 5,906,730 A | 5/1999 | Hatanaka et al. |
| 5,928,497 A | 7/1999 | Iaccino |
| 5,958,224 A | 9/1999 | Ho et al. |
| 5,990,370 A | 11/1999 | Sims |
| 6,063,265 A | 5/2000 | Chiyoda et al. |
| 6,096,194 A | 8/2000 | Tsybulevskiy et al. |
| 6,103,393 A | 8/2000 | Kodas et al. |
| 6,120,679 A | 9/2000 | Hatanaka et al. |
| 6,153,123 A | 11/2000 | Hampden-Smith et al. |
| 6,159,267 A | 12/2000 | Hampden-Smith et al. |
| 6,197,718 B1 | 3/2001 | Brignac et al. |
| 6,228,254 B1 | 5/2001 | Jossens et al. |
| 6,248,230 B1 | 6/2001 | Min et al. |
| 6,277,271 B1 | 8/2001 | Kocal |
| 6,303,020 B1 | 10/2001 | Podrebarac et al. |
| 6,316,100 B1 | 11/2001 | Kodas et al. |
| 6,325,921 B1 | 12/2001 | Andersen |
| 6,334,948 B1 | 1/2002 | Didillon et al. |
| 6,488,840 B1 | 12/2002 | Greaney et al. |
| 6,500,219 B1 | 12/2002 | Gunnerman |
| 6,551,501 B1 | 4/2003 | Whitehurst et al. |
| 6,579,444 B2 | 6/2003 | Feimer et al. |
| 6,596,157 B2 | 7/2003 | Gupta et al. |
| 6,610,197 B2 | 8/2003 | Stuntz et al. |
| 6,623,627 B1 | 9/2003 | Zhou |
| 6,685,762 B1 | 2/2004 | Brewster et al. |
| 6,689,186 B1 | 2/2004 | Hampden-Smith et al. |
| 6,699,304 B1 | 3/2004 | Hampden-Smith et al. |
| 6,780,350 B1 | 8/2004 | Kodas et al. |
| 6,827,845 B2 | 12/2004 | Gong et al. |
| 6,881,325 B2 | 4/2005 | Morris et al. |
| 7,144,498 B2 | 12/2006 | McCall et al. |
| 7,264,710 B2 | 9/2007 | Hokari et al. |
| 7,435,330 B2 | 10/2008 | Hokari et al. |
| 7,731,837 B2 | 6/2010 | Song et al. |
| 7,754,067 B2 | 7/2010 | Allam |
| 7,780,847 B2 | 8/2010 | Choi |
| 7,842,181 B2 | 11/2010 | Choi |
| 7,922,895 B2 | 4/2011 | Banerjee |
| 8,367,425 B1 | 2/2013 | Schabron et al. |
| 8,399,729 B2 | 3/2013 | Davis |
| 8,496,786 B2 | 7/2013 | Larson |
| 8,648,224 B2 | 2/2014 | Vermeiren |
| 8,696,888 B2 | 4/2014 | Keusenkothen |
| 8,784,743 B2 * | 7/2014 | Keusenkothen ....... B01D 3/009 422/187 |
| 9,290,706 B2 | 3/2016 | Zhao |
| 9,505,678 B2 | 11/2016 | Choi et al. |
| 9,567,530 B2 | 2/2017 | Choi |
| 9,650,578 B2 | 5/2017 | De Klerk |
| 9,656,230 B2 | 5/2017 | Choi |
| 9,670,419 B2 | 6/2017 | Choi |
| 9,777,566 B2 | 10/2017 | Matzakos |
| 2002/0086150 A1 | 7/2002 | Hazlebeck |
| 2002/0162332 A1 | 11/2002 | Hazlebeck |
| 2003/0062163 A1 | 4/2003 | Moulton et al. |
| 2003/0168381 A1 | 9/2003 | Hokari et al. |
| 2003/0217952 A1 | 11/2003 | Brignac et al. |
| 2004/0007506 A1 | 1/2004 | Song et al. |
| 2004/0024072 A1 | 2/2004 | Lin et al. |
| 2004/0118748 A1 | 6/2004 | Lesemann et al. |
| 2004/0178123 A1 | 9/2004 | Podrebarac |
| 2004/0188327 A1 | 9/2004 | Groten |
| 2004/0232046 A1 | 11/2004 | Tanaka et al. |
| 2005/0040078 A1 | 2/2005 | Zinnen et al. |
| 2005/0040081 A1 | 2/2005 | Takahashi et al. |
| 2005/0067323 A1 | 3/2005 | Balko |

(56) References Cited

U.S. PATENT DOCUMENTS

| | | |
|---|---|---|
| 2005/0072137 A1 | 4/2005 | Hokari et al. |
| 2005/0075528 A1 | 4/2005 | Burkhardt et al. |
| 2005/0098478 A1 | 5/2005 | Gupta et al. |
| 2005/0167333 A1 | 8/2005 | McCall et al. |
| 2005/0173297 A1 | 8/2005 | Toida |
| 2005/0252831 A1 | 11/2005 | Dysard et al. |
| 2005/0284794 A1 | 12/2005 | Davis et al. |
| 2006/0011511 A1 | 1/2006 | Hokari et al. |
| 2006/0043001 A1 | 3/2006 | Weston et al. |
| 2006/0151359 A1* | 7/2006 | Ellis ............... C10G 67/06 208/209 |
| 2006/0154814 A1 | 7/2006 | Zanibelli et al. |
| 2006/0163117 A1 | 7/2006 | Hong |
| 2007/0056881 A1 | 3/2007 | Berkowitz et al. |
| 2007/0090021 A1 | 4/2007 | McCall et al. |
| 2007/0111319 A1 | 5/2007 | Bastide et al. |
| 2007/0227950 A1 | 10/2007 | Martinie et al. |
| 2007/0234640 A1 | 10/2007 | Jia et al. |
| 2007/0289898 A1 | 12/2007 | Banerjee |
| 2008/0099373 A1 | 5/2008 | Hokari et al. |
| 2008/0099374 A1 | 5/2008 | He et al. |
| 2008/0099375 A1 | 5/2008 | Landau et al. |
| 2008/0099376 A1 | 5/2008 | He et al. |
| 2008/0099377 A1 | 5/2008 | He et al. |
| 2009/0032436 A1 | 2/2009 | Takahashi et al. |
| 2009/0139715 A1 | 6/2009 | Choi |
| 2009/0145807 A1 | 6/2009 | Choi et al. |
| 2009/0145808 A1 | 6/2009 | Choi et al. |
| 2009/0148374 A1 | 6/2009 | Choi |
| 2009/0159498 A1 | 6/2009 | Chinn et al. |
| 2009/0159504 A1 | 6/2009 | Choi et al. |
| 2009/0166261 A1 | 7/2009 | Li et al. |
| 2009/0166262 A1 | 7/2009 | He et al. |
| 2009/0206006 A1 | 8/2009 | Allam |
| 2009/0206007 A1 | 8/2009 | Allam |
| 2009/0230026 A1 | 9/2009 | Choi et al. |
| 2009/0314683 A1 | 12/2009 | Matsushita |
| 2010/0189610 A1 | 7/2010 | Allam |
| 2010/0314583 A1 | 12/2010 | Banerjee |
| 2011/0024330 A1 | 2/2011 | Choi |
| 2011/0147266 A1 | 6/2011 | Choi |
| 2011/0163011 A1 | 7/2011 | Yarbro |
| 2011/0198085 A1 | 8/2011 | O'Brian |
| 2011/0266115 A1 | 11/2011 | Berkowitz et al. |
| 2011/0297506 A1 | 12/2011 | Choi et al. |
| 2011/0315600 A1 | 12/2011 | Choi et al. |
| 2012/0000819 A1 | 1/2012 | Matsushita |
| 2012/0060418 A1 | 3/2012 | Epstein et al. |
| 2012/0061291 A1 | 3/2012 | Choi et al. |
| 2012/0061294 A1 | 3/2012 | Choi et al. |
| 2012/0132566 A1 | 5/2012 | Janssen et al. |
| 2012/0138510 A1 | 6/2012 | Choi et al. |
| 2012/0181217 A1 | 7/2012 | Choi et al. |
| 2013/0180888 A1 | 7/2013 | Corscadden et al. |
| 2013/0233766 A1 | 9/2013 | Shafi et al. |
| 2013/0267745 A1 | 10/2013 | Schrod |
| 2014/0054198 A1 | 2/2014 | Podrebarac |
| 2014/0109465 A1 | 4/2014 | Coppola et al. |
| 2014/0353138 A1* | 12/2014 | Amale ............... C10G 7/06 203/88 |
| 2015/0090631 A1 | 4/2015 | Joo et al. |
| 2015/0321975 A1* | 11/2015 | Choi ............... C07C 4/04 585/400 |
| 2015/0376512 A1 | 12/2015 | Lourenco |
| 2017/0107433 A1 | 4/2017 | Choi |
| 2017/0166819 A1 | 6/2017 | Choi |
| 2017/0166821 A1 | 6/2017 | Choi |
| 2017/0166824 A1 | 6/2017 | Choi |
| 2018/0265792 A1 | 9/2018 | Choi et al. |

FOREIGN PATENT DOCUMENTS

| | | |
|---|---|---|
| EP | 0199555 A2 | 10/1986 |
| EP | 0341893 A2 | 11/1989 |
| EP | 1454976 A1 | 9/2004 |
| EP | 1537912 A1 | 6/2005 |
| EP | 1577007 A1 | 9/2005 |
| EP | 1923452 A1 | 5/2008 |
| GB | 1098698 A | 1/1968 |
| JP | 07265689 A | 10/1995 |
| JP | 2003277770 A | 10/2003 |
| JP | 2005015533 A | 1/2005 |
| WO | 9600269 | 1/1996 |
| WO | 0179391 | 10/2001 |
| WO | 02053684 | 7/2002 |
| WO | 2005005582 A1 | 1/2005 |
| WO | 2007015391 A1 | 2/2007 |
| WO | 2009070561 A1 | 6/2009 |
| WO | 20090073446 A2 | 6/2009 |
| WO | 20110132056 A2 | 10/2011 |
| WO | 20130066852 A2 | 5/2013 |

OTHER PUBLICATIONS

Adschiri et al., "Catalytic Hydrodesulfurization of Dibenzothiophene through Partial Oxidation and Water—Gas Shift Reaction in Supercritical Water", published in Ind. Eng. Chem. Res., vol. 37, pp. 2634-2638, (1998).

Adschiri et al., "Hydrogenation through Partial Oxidation of Hydrocarbon in Supercritical Water", published in Int. J. of the Soc. of Mat. Eng. for Resources, vol. 7, No. 2, pp. 273-281, (1999).

Amemiya et al., "Catalyst Deactivation in Distillate Hydrotreating (Part 2) Raman Analysis of Carbon Deposited on Hydrotreating Catalyst for Vacuum Gas Oil", Journal of the Japan Petroleum Institute (2003), pp. 99-104, vol. 46, No. 2.

Amestica and Wolf, "Catalytic Liquefaction of Coal With Supercritical Water/CO/Solvent Media", XP-002663069, Fuel, Sep. 30, 1986, pp. 1226-1332, vol. 65, Butterworth & Co. (1986).

Arturo J. Hernandez and Ralph T. Yang, "Desulfurization of Transportation Fuels by Adsorption", Catalysis Reviews (2004), pp. 111-150, vol. 46, No. 2.

Chica et al., "Catalytic oxidative desulfurization (ODS) of diesel fuel on a continuous fixed-bed reactor", Journal of catalysis, vol. 242, (2006), pp. 299-308.

Choi et al., "Facile ultra-deep desulfurization of gas oil through two-stage or layer catalyst bed", Catalysis Today (2003), vol. 86, pp. 277-286.

Choi et al., Impact of removal extent of nitrogen species in gas oil on its HDS performance: an efficient approach to its ultra deep desulfurization:, Applied Catalysis B: Environmental (2004), vol. 50, pp. 9-16.

Choi et al., "Preparation and Characterization on nano-sized CoMo/Al2o3 catalyst for hydrodesulfurization", Applied catalysis A: General 260 (2004) 229-236.

Choi et al., "Preparation of CO2 Absorbent by Spray Pyrolysis", Chemistry Letters, vol. 32, No. 10 (2003), pp. 924-925.

De Filippis et al., "Oxidation Desulfurization: Oxidation Reactivity of Sulfur Compounds in Different Organic Matrixes", Energy & Fuels, vol. 17, No. 6 (2003), pp. 1452-1455.

Duan, P., et al., Upgrading of Crude Algal Bio-Oil in Supercritical Water; Bioresource Technology; Aug. 7, 2010; pp. 1899-1906; vol. 102; Elsevier Ltd.; www.elsevier.com/locate/biortech.

E. Raymundo-Pinero et al., "Temperature programmed desorption study on the mechanism of SO2 oxidation by activated carbon and activated carbon fibres," Carbon, vol. 39 (2001) p. 231-242.

Farag et al., "Carbon versus alumina as a support for Co-Mo catalysts reactivity towards HDS of dibenzothiophenes and diesel fuel", Catalysis Today 50 (1999) 9-17.

Fathi, et al., "Catalytic Aquaproessing of Arab Light Vacuum Residue via Short Space Times", Energy & Fuels, 25, 4867-4877(2011).

Furimsky et al., "Deactivation of hydroprocessing catalyst", Catalysis Today (1999), pp. 381-495, vol. 52.

Gao et al., "Adsorption and reduction of NO2 over activated carbon at low temperature", Fuel Processing Technology 92, 2011, pp. 139-146, Elsevier B.V.

(56) References Cited

OTHER PUBLICATIONS

Gray, et al., "Role of Chain Reactions and Olefin Formation in Cracking, Hydroconversion, and Coking of Petroleum and Bitumen Fractions", Energy & Fuels, 16, 756-766(2002).

I. Mochida et al., "Kinetic study of the continuous removal of Sox on polyacrylonitrile-based activated carbon fibres," Fuel, vol. 76, No. 6 (1997), p. 533-536.

I. Mochida et al., "Removal of Sox and Nox over activated carbon fibers," Carbon, vol. 38 (2000), p. 227-239.

J.G. Speight, "Visbreaking: A technology of the past and the future", Scientia Iranica, vol. 19, Issue 3, Jun. 2012, pp. 569-573.

J.T. Sampanthar et al., "A novel oxidative desulfurization process to remove refractory sulfur compounds from diesel fuel," Applied Catalysis B: Environmental 63 (2006), p. 85-93.

Kniel, et al., "Ethylene; Keystone to the Petrochemical Industry", Marcel Dekker, New York(NY), 1980, pp. 62-72. ISBN 0-8247-6914-7.

M. Te et al., "Oxidation reactivities of dibenzothiophenes in polyoxometalate/H2O2 and formic acid/H2O2 systems," Applied Catalysis A: General 219 (2001), p. 267-280.

Masaomi Amemiya, Yozo Korai, and Isao Mochida, "Catalyst Deactivation in Distillate Hydrotreating (Part 2) Raman Analysis of Carbon Deposited on Hydrotreating Catalyst for Vacuum Gas Oil," Journal of the Japan Petroleum Institute (2003), pp. 99-104.

Mochida et al., "Kinetic study of the continuous removal of Sox on polyacrylonitrile-based activated carbon fibers", Fuel, vol. 76, No. 6 (1997), pp. 533-536.

Mochida et al., "Removal of Sox and Nox over activated carbon fibers", Carbon, vol. 38 (2000), pp. 227-239.

PCT International Search Report and Written Opinion dated Mar. 29, 2012, International Application No. PCT/US2011/041413, International Filing Date Jun. 22, 2011.

PCT/US2018/022301 International Search Report and Written Opinion dated May 22, 2018; 14 pgs.

Perry's Chemical Engineers' Handbook, Eighth Ed., 2008, McGraw-Hill, pp. 10-24-10-27.

Peterson, A., et al., Thermochemical Biofuel Production in Hydrothermal Media: A Review of Sub- and Supercritical Water Technologies; Energy & Environmental Science; Jul. 9, 2008; pp. 32-65; vol. 1; The Royal Society of Chemistry; www.rsc.org.ees.

Pinero et al., "Temperature programmed desorption study on the mechanism of SO2 oxidation by activated carbon and activated carbon fibers", Carbon, vol. 39 (2001), pp. 231-242.

Sampanthar et al., "A novel oxidative desulfurization process to remove refractory sulfur compounds from diesel fuel", Applied Catalysis B: Environmental 63 (2006), pp. 85-93.

Sano et al., "Effects of nitrogen and refractory sulfur species removal on the deep HDS of gas oil", Applied Catalysis B: Environmental (2004), vol. 53, pp. 169-174.

Sano et al., "Two-step adsorption process for deep desulfurization of diesel oil", Fuel (2005), pp. 903-910, vol. 84, Elsevier Ltd.

Totten, "Fuels and Lubricants Handbook—Technology, Properties, Performance, and Testing", ASTM International, 2003, pp. 23.

* cited by examiner

INTEGRATED SUPERCRITICAL WATER AND STEAM CRACKING PROCESS

RELATED APPLICATIONS

This application is a divisional application of U.S. patent application Ser. No. 15/920,099 filed on Mar. 13, 2018, which is related to and claims priority from U.S. Pat. App. No. 62/471,016 filed on Mar. 14, 2017. For purposes of United States patent practice, this application incorporates the contents of both the provisional application and non-provisional application by reference in their entirety.

TECHNICAL FIELD

Disclosed are methods for upgrading petroleum. Specifically, disclosed are methods and systems for upgrading petroleum using an integrated supercritical water and steam cracking process.

BACKGROUND

Conventionally, ethane and naphtha (boiling point less than 200 degrees Celsius (deg C.)) can be used to produce light olefins, such as ethylene and propylene by a steam cracking process. Naphtha, such as straight run naphtha, can be a paraffin-rich hydrocarbon stream. However, the naphtha fraction in crude oil can be limited to between 10 and 30 percent by volume (vol %). Conventional steam cracking processes can be used to process gas oil. Gas oil refers to hydrocarbons with a boiling point between 200 deg C. and 565 deg C., where light gas oil has a boiling point between 200 deg C. and 370 deg C., and where vacuum gas oil has a boiling point between 200 deg C. and 565 deg C. Due to the presence of heavier molecules steam cracking of gas oil results in a reduced yield of ethylene and propylene and greater coking rates relative to steam cracking of naptha.

In petroleum-based crude oils, various types of molecules are present. Per their chemical structure, molecules can be classified as paraffin, olefin, naphthene (a cyclic paraffin), and aromatic, which can be indicated by an oil composition's PONA number. Of the molecules, it is most efficient to convert paraffins to light olefins, with n-paraffins being more effectively converted than iso-paraffins, and for this reason n-paraffins can be preferred. Aromatics, such as benzene and toluene, are stable at high temperatures, have a low hydrogen to carbon ratio, and are known to be an effective precursor for coke formation. The stability of aromatics can be contributed to the carbon-carbon bond energies of the aromatic carbon, as compared to the carbon-carbon bond energies of paraffinic carbons. For these reasons, aromatics are difficult to convert and are not a good source for producing light olefins. Naphthenes as a source material are more difficult to convert than paraffins, but easier to convert than aromatics. Olefinic compounds are generally cracked in a steam cracker to produce light paraffins and olefins while aromatics with longer-chained olefins are formed through cyclization followed by dehydrogenation reactions. Thus, a feedstock for a steam cracking process preferably contains a majority n-paraffins, followed by iso-paraffins, and naphthenes with little or no olefins or aromatics.

Steam cracking processes cannot effectively process heavy fractions that contain asphaltene. Steam cracking asphaltene can produce coke, which can result in plugging of the process lines.

Some pre-treatment steps can be taken to make gas oil or other heavy oils suitable for use as a steam cracking process feedstock. Pre-treatment approaches can include hydrotreatment, thermal conversion, extraction, and distillation. Extraction processes can include a solvent deasphalting process. However, these processes produce liquid yields of less than 80 percent by volume, resulting in analogous low product recovery from the steam cracking process. In addition, pre-treatment processes can increase the cost per barrel to the resultant products.

SUMMARY

Disclosed are methods for upgrading petroleum. Specifically, disclosed are methods and systems for upgrading petroleum using an integrated supercritical water and steam cracking process.

In a first aspect, a method for producing a supercritical water (SCW)-treated product is provided. The method includes the steps of introducing a mixed stream to a convection section of a furnace to produce a convection upgraded stream, where the temperature of the convection upgraded stream is between the critical temperature of water and 500 deg C., where conversion reactions occur in the convection section, introducing the convection upgraded stream to a supercritical reactor to produce a reactor effluent, where the supercritical reactor is maintained at a temperature between 380 deg C. and 450 deg C. and a pressure between 23 MPa and 35 MPa, wherein one or more conversion reactions occur in supercritical reactor, and introducing the reactor effluent to a post-reaction stage to produce the SCW-treated product, wherein the SCW-treated product has an increased paraffin concentration as compared to the crude oil stream, wherein the SCW-treated product include an amount of water.

In certain aspects, the post-reaction stage can be configured to adjust the amount of water in the SCW-treated product. In certain aspects, the method further includes the step of introducing the SCW-treated product to the convection section of the furnace to produce a furnace effluent, where the SCW-treated product is subjected to one or more conversion reactions, where the furnace effluent is withdrawn from a radiation section of the furnace. In certain aspects, the method further includes the steps of introducing the SCW-treated product to an intermediate unit to produce a product stream, and introducing the product stream to the convection section of the furnace to produce a furnace effluent, where the product stream is subjected to one or more conversion reactions, where the furnace effluent is withdrawn from a radiation section of the furnace. In certain aspects, the intermediate unit can be selected from the group consisting of a hydrotreating process, a distillation process, and a thermal conversion process. In certain aspects, the intermediate unit is a hydrotreating process and the product stream is a hydrotreating (HTP)-product. In certain aspects, the crude oil stream includes a concentration of a vacuum residue fraction that is greater than 20 percent by weight (wt %) and a total sulfur content that is greater than 1.5 wt % sulfur. In certain aspects, the amount of water in the SCW-treated product is less than 1,000 parts-per-million by weight (wt ppm). In certain aspects, the method further includes the step of introducing hydrogen gas to the hydrotreating process. In certain aspects, the intermediate unit is a distillation process and the product stream is a distilled product. In certain aspects, the distillation process is selected from the group consisting of an atmospheric distillation unit, a vacuum distillation unit, and a combination thereof. In certain aspects, the SCW-treated product includes a concentration of the vacuum residue fraction that is greater than 20 wt %. In certain aspects, a cut point of distillation of the distillation process is between 650 degrees Fahrenheit (deg F.) and 1050 deg F. In certain aspects, the intermediate unit is a thermal conversion process and the product stream is a thermal liquid product. In certain aspects, the thermal process can be selected from the group consisting of a coking process and a visbreaking process. In certain aspects, the thermal liquid product includes a concentration of the vacuum residue fraction of less than 5 wt %. In certain aspects, the method further includes the steps of pressurizing a crude oil stream in a feed pump to a pressure at or greater than the critical pressure of water to produce a pressurized oil, heating the pressurized oil in a feed heater to a temperature at or less than 150 deg C. to produce a hot oil stream, pressurizing the water stream in a water pump to a pressure at or greater than the critical pressure of water to produce a pressurized water, heating the pressurized water in a water heater to a temperature at or greater than the critical temperature of water to produce a supercritical water stream, and mixing the hot oil stream and the supercritical water stream to produce the mixed stream. In certain aspects, the method further includes the steps of pressurizing a crude oil stream in a feed pump to a pressure at or greater than the critical pressure of water to produce a pressurized oil, pressurizing the water stream in a water pump to a pressure at or greater than the critical pressure of water to produce a pressurized water, mixing the pressurized oil and pressurized water to produce the mixed stream, a pressurized mix.

In a second aspect, an apparatus for upgrading a crude oil stream is provided. The apparatus includes a pre-reaction stage configured to produce a mixed stream from the crude oil stream and a water stream, a reaction stage fluidly connected to the pre-reaction stage. The reaction stage includes a convection section of a furnace fluidly connected to the pre-reaction stage, the convection section configured to subject the mixed stream to conversion reactions to produce convection upgraded stream and a supercritical reactor fluidly connected to the convection section, the supercritical reactor configured to subject the convection upgraded stream to conversion reactions to produce a reactor effluent. The apparatus further includes a post-reaction stage fluidly connected to the reaction stage, the post-reaction stage configured to separate the reactor effluent to produce a supercritical water (SCW)-treated product, wherein the SCW-treated product includes an increased paraffin concentration as compared to crude oil stream, wherein the SCW-treated product includes an amount of water.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
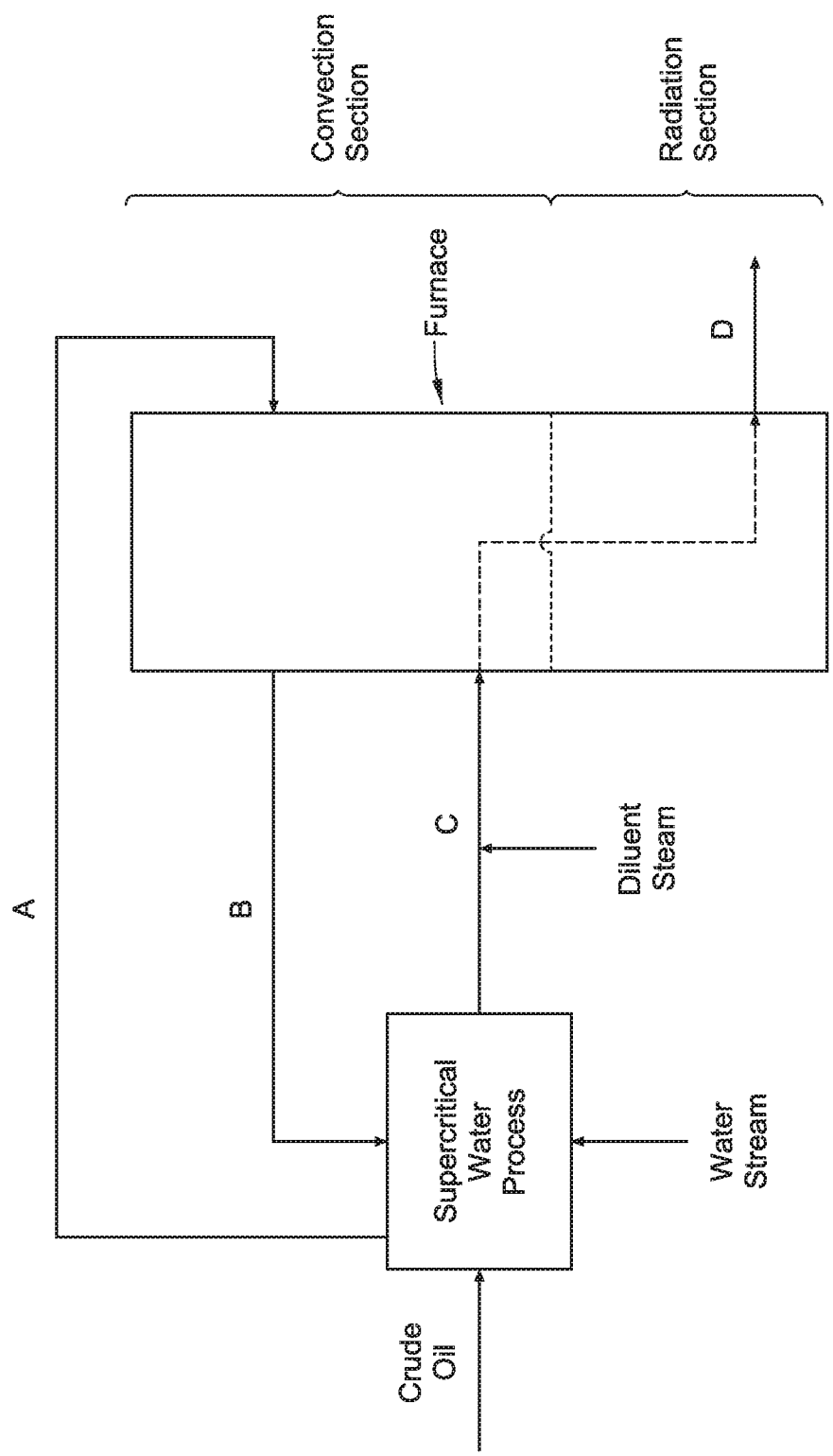
FIG. 1 provides a process diagram of the process.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

Described here are processes and systems of an integrated supercritical water and steam cracking process. The supercritical water process can convert crude oil to a feedstock suitable for stream cracking to produce light olefins, such as ethylene and propylene, as well as aromatics such as benzene, toluene, and xylene. The integrated supercritical water and steam cracking process leads to synergy improving conversion to olefins.

The processes and systems of a supercritical water process upstream of a steam cracking process advantageously overcomes drawbacks of conventional pre-treating processes upstream of a steam cracking process. The integrated supercritical water and steam cracking process produces a greater liquid yield than a conventional combination process. The processes and systems of an integrated supercritical water and steam cracking process described here can increase the hydrogen content of the feedstock to the steam cracking process. An increased hydrogen content in the feedstock can result in an increased yield of light olefins in the product effluent from the steam cracking process.

The processes and systems of an integrated supercritical water and steam cracking process described here can decrease the amount of heavy residue fractions, such as atmospheric residue and vacuum residue, in the product stream as compared to the feed stream. Advantageously, decreasing the heavy residue fraction in the feed to a steam cracker can reduce or mitigate coking; coke can form a layer in the pyrolysis tube of the steam cracking process which can inhibit heat transfer, cause physical failure of the pyrolysis tube, and shorten the run length of a steam cracker between cleaning and turnaround maintenance.

The processes and systems of an integrated supercritical water and steam cracking process described here can decrease the concentration of heteroatoms, such as sulfur compounds and metal compounds in the product relative to the feed. Sulfur compounds can suppress carbon monoxide formation in a steam cracking process by passivating the inner surface of the pyrolysis tube. The presence of sulfur can form nickel sulfide, passivating the nickel present in the pyrolysis tube. Passivated nickel cannot catalyze coke gasification, which produces carbon monoxide, so the passivation by the presence of sulfur reduces the amount of carbon monoxide produced. At pyrolysis conditions, passivation cannot be reversed, that is at pyrolysis conditions the nickel does not return to nickel metal or oxide by losing sulfur. In certain applications, sulfur can be added to a feedstock for a steam cracking process to maintain a sulfur concentration of between 20 parts-per-million by weight (wt ppm) and 400 wt ppm. Sulfur concentrations greater than 400 wt ppm can increase the coking rate in a steam cracking process.

Advantageously, the processes and systems of an integrated supercritical water and steam cracking process described here can expand the range of crude oils suitable for use to produce light olefins.

As used throughout, "hydrogen content" refers to the quantity of the hydrogen atoms bonded to carbon atoms and does not refer to free hydrogen.

As used throughout, "external supply of hydrogen" refers to the addition of hydrogen to the feed to the reactor or to the reactor itself. For example, a reactor in the absence of an external supply of hydrogen means that the feed to the reactor and the reactor are in the absence of added hydrogen, gas ($H_2$) or liquid, such that no hydrogen (in the form $H_2$) is a feed or a part of a feed to the reactor.

As used throughout, "external supply of catalyst" refers to the addition of catalyst to the feed to the reactor or the presence of a catalyst in the reactor, such as a fixed bed catalyst in the reactor. For example, a reactor in the absence of an external supply of catalyst means no catalyst has been added to the feed to the reactor and the reactor does not contain a catalyst bed in the reactor.

As used throughout, "crude oil" refers to petroleum hydrocarbon streams that can include whole range crude oil, reduced crude oil, and refinery streams. "Whole range crude oil" refers to passivated crude oil which has been processed by a gas-oil separation plant after being recovered from a production well. "Reduced crude oil" can also be known as "topped crude oil" and refers to a crude oil having no light fraction, and would include an atmospheric residue stream or a vacuum residue stream. Refinery streams can include "cracked oil," such as light cycle oil, heavy cycle oil, and streams from a fluid catalytic cracking unit (FCC), such as slurry oil or decant oil, a heavy stream from hydrocracker with a boiling point greater than 650 deg F., a deasphalted oil (DAO) stream from a solvent extraction process, and a mixture of atmospheric residue and hydrocracker bottom fractions.

As used throughout, "heavy oil" refers to hydrocarbons heavier than gas oil and can include vacuum gas oil, atmospheric residue, vacuum residue, and combinations of the same.

As used throughout, "atmospheric residue" or "atmospheric residue fraction" refers to the fraction of oil-containing streams having an initial boiling point (IBP) of 650 deg F., such that all of the hydrocarbons have boiling points greater than 650 deg F. and includes the vacuum residue fraction. Atmospheric residue can refer to the composition of an entire stream, such as when the feedstock is from an atmospheric distillation unit, or can refer to a fraction of a stream, such as when a whole range crude is used.

As used throughout, "vacuum residue" or "vacuum residue fraction" refers to the fraction of oil-containing streams having an IBP of 1050 deg F. Vacuum residue can refer to the composition of an entire stream, such as when the feedstock is from a vacuum distillation unit or can refer to a fraction of stream, such as when a whole range crude is used.

As used throughout, "asphaltene" refers to the fraction of an oil-containing stream which is not soluble in a n-alkane, particularly, n-heptane.

As used throughout, "heavy fraction" refers to the fraction in the petroleum feed having a true boiling point (TBP) 10% that is equal to or greater than 650 deg F. (343 deg C.), and alternately equal to or greater than 1050 deg F. (566 deg C.). Examples of a heavy fraction can include the atmospheric residue fraction or vacuum residue fraction. The heavy fraction can include components from the petroleum feed that were not converted in the supercritical water reactor. The heavy fraction can also include hydrocarbons that were dimerized or oligomerized in the supercritical water reactor due to either lack of hydrogenation or resistance to thermal cracking.

As used throughout, "light fraction" refers to the fraction in the petroleum feed that is not considered the heavy fraction. For example, when the heavy fraction refers to the fraction having a TBP 10% that is equal to or greater than 650 deg F. the light fraction has a TBP 90% that is less than 650 deg F. For example, when the heavy fraction refers to the fraction having a TBP 10% equal to or greater than 1050 deg F. the light fraction has a TBP 90% that is less than 1050 deg F.

As used throughout, "light olefins" refers to ethylene, propylene, n-butene, iso-butene, 2-butenes and combinations of the same. Each of ethylene, propylene, n-butene, and iso-butene is a light olefin and together they are light olefins.

As used throughout, "long chain paraffins" refers to paraffins with more than 4 carbons arranged in a line or chain.

As used throughout, "favor" means that reaction conditions are disposed toward the production of certain products from the reactant mixture.

As used throughout, "distillable fraction" or "distillate" refers to the hydrocarbon fraction lighter than the distillation residue from an atmospheric distillation process or a vacuum distillation process.

As used here, "majority" means 51 percent (%) or more.

As used throughout, "coke" refers to the toluene insoluble material present in petroleum.

As used throughout, "cracking" refers to the breaking of hydrocarbons into smaller ones containing few carbon atoms due to the breaking of carbon-carbon bonds.

As used throughout, "upgrade" means one or all of increasing API gravity, decreasing the amount of impurities, such as sulfur, nitrogen, and metals, decreasing the amount of asphaltene, and increasing the amount of distillate in a process outlet stream relative to the process feed stream. One of skill in the art understands that upgrade can have a relative meaning such that a stream can be upgraded in comparison to another stream, but can still contain undesirable components such as impurities.

It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include upgrading reactions, desulfurization reactions denitrogenation reactions, and demetallization reactions. Supercritical water is water at a temperature at or greater than the critical temperature of water and at a pressure at or greater than the critical pressure of water.

The critical temperature of water is 373.946° C. The critical pressure of water is 22.06 megapascals (MPa). Without being bound to a particular theory, it is understood that the basic reaction mechanism of supercritical water mediated petroleum processes is the same as a free radical reaction mechanism. Thermal energy creates radicals through chemical bond breakage. Supercritical water creates a "cage effect" by surrounding the radicals. The radicals surrounded by water molecules cannot react easily with each other, and thus, intermolecular reactions that contribute to coke formation are suppressed. The cage effect suppresses coke formation by limiting inter-radical reactions compared to conventional thermal cracking processes, such as delayed coker. Thermal cracking of a paraffin feed can produce paraffins and olefins having reduced numbers of carbons per molecule as compared to the paraffin feed. The relative amount of paraffins and olefins and the distribution of carbon numbers strongly depends on the phase where the thermal cracking occurs. In the liquid phase, faster hydrogen transfer between molecules occurs due to the high density creating closer distances between the molecules which makes hydrogen transfer between molecules easier and faster. Thus, the liquid phase facilitates the formation of more paraffins than gas-phase cracking. Additionally, liquid phase cracking shows generally even distribution of the carbon numbers of the product while gas phase cracking has more light paraffins and olefins in the product. While, supercritical water facilitates hydrogen transfer between molecules, it is inevitable to produce unsaturated hydrocarbons due to a limited amount of available hydrogen. Unsaturated carbon-carbon bonds can be distributed through the whole range of boiling points. Olefins, as a representative unsaturated hydrocarbon, are valuable chemicals, but low stability can cause many problems such as gum formation when exposed to air. Thus, it is common practice in the modern refinery to saturate olefins with hydrogen in the presence of catalyst. Advantageously, at supercritical conditions water acts as both a hydrogen source and a solvent (diluent) in upgrading reactions, desulfurization reactions and demetallization reactions and a catalyst is not needed. Hydrogen from the water molecules is transferred to the hydrocarbons through direct transfer or through indirect transfer, such as the water gas shift reaction.

As used here, "conversion reactions" refers to reactions that can upgrade a hydrocarbon stream including cracking, isomerization, alkylation, dimerization, aromatization, cyclization, desulfurization, denitrogenation, deasphalting, and demetallization.

As used here, "steam cracking process" refers to a process where thermal cracking reactions occur in the presence of steam. The steam cracking process can include a furnace. The furnace can include a convection section and a radiation section. The convection section can be used for preheating a feedstock stream, a water stream, and other streams. The convection section can operate at a temperature at or greater than 650 deg C. The convection section can operate at a pressure between 2 bar (200 kPa) and 5 bar (500 kPa). Steam can be injected with the hydrocarbon stream in the convection section. Vaporization of the feed to a steam cracking process can increase light olefin production. Vapor-phase cracking of hydrocarbons in the convection section can lead to formation of light molecules, such as $C_2$ and $C_3$ compounds, while liquid-phase cracking can lead to middle range molecules, such as $C_7$ and $C_8$ compounds. Operating conditions to increase vaporization are maintained to avoid the conversion to coke due to non-vaporized hydrocarbons. Steam, as a diluent, can suppress coke formation. After passing through the convection section, the stream can enter the radiation section where thermal cracking can occur. The radiation section can operate at a temperature between 750 deg C. and 850 deg C. The radiation section can operate at a pressure between 2 bar and 5 bar. The radiation section can be used for severe cracking of hydrocarbons to produce light olefins.

As used here, "supercritical water process" refers to a process where crude oil undergoes conversion reactions in the presence of supercritical water at supercritical conditions to produce an upgraded hydrocarbon stream. A supercritical water process includes a pre-reaction stage, a reaction stage, and a post-reaction stage. The pre-reaction stage can include units to pressurize, heat and mix the feed streams, such as pumps, heaters, and mixers. The reaction stage can include at least one supercritical water reactor. The post-reaction stage can include units to separate the effluent from the reaction stage and can include heat exchangers, pressure letdown devices, and one or more separation vessels.

Referring to FIG. 1, a general process diagram of an integrated supercritical water and steam cracking process is provided. Stream A is produced in a supercritical water process from a mixture of a crude oil and a water stream. The crude oil and water stream can be pressurized or pressurized and heated in the pre-reaction stage of the supercritical water process before forming Stream A. Stream A is introduced to the convection section of a furnace of a steam cracking process. The temperature of Stream A is increased in the convection section to a temperature between the critical temperature of water and 500 deg C. and alternately between the critical temperature of water and 450 deg C. Conversion reactions involving the components of Stream A begin to occur in the convection section so as to produce a partially upgraded stream in Stream B. Stream B can be introduced to the reaction stage of the supercritical water process to be further upgraded. Stream C is a product stream withdrawn from the post-reaction stage of the supercritical water process and is upgraded relative to the crude oil. The composition of Stream C, including the amount of water, can be adjusted in the post-reaction stage of the supercritical water process. Stream C can be combined with a diluent steam and introduced to the convection section of the furnace. The need for diluent steam can be determined based on a composition of Stream C. In the convection section, components of Stream C can mix with components of Stream A and can be carried out in Stream B. Components of Stream C can enter the radiation section of the furnace and be carried out in Stream D. Stream D can contain olefins and other cracked hydrocarbon components.

The following embodiments, provided with reference to the figures, describe the integrated supercritical water and steam cracking process in more detail An integrated supercritical water and steam cracking process is described with reference to FIG. 2A.

In pre-reaction stage 100, crude oil stream 2 can include crude oil. In at least one embodiment, crude oil stream 2 can include an atmospheric residue fraction of between 20 wt % and 95 wt % and a vacuum residue fraction of between 3 wt % and 50 wt %. Crude oil stream 2 can be pressurized in feed pump 115 to a pressure greater than the critical pressure of water to produce pressurized oil 215. Pressurized oil 215 can be heated in feed heater 120 to produce hot oil stream 220. Feed heater 120 can be any type of heater capable of increasing the temperature of pressurized oil 215 such as a gas fired heater or an electric heater. The temperature of hot oil stream 220 can be less than the critical temperature of water, alternately equal to about 150 deg C., and alternately less than 150 deg C. Maintaining the temperature of hot oil stream 220 at less than the critical temperature of water reduces the formation of coke in hot oil stream 220 and in supercritical reactor 140.

Water stream 4 can be a demineralized water having a conductivity less than 1.0 microSiemens per centimeter (μS/cm), and alternately less than 0.1 μS/cm. In at least one embodiment, water stream 4 is demineralized water having a conductivity less than 0.1 μS/cm. Water stream 4 can be pressurized in water pump 105 to a pressure greater than the critical pressure of water to produce pressurized water 205. Pressurized water 205 can be heated in water heater 110 to produce supercritical water stream 210. The temperature of supercritical water stream 210 can be equal to or greater than the critical temperature of water, alternately equal to or greater than 380 deg C., and alternately between 380 deg C. and 500 deg C.

Feed pump 115 and water pump 105 can be any pumps capable of increasing the pressure of the respective fluid stream to a pressure greater than the critical pressure of water. In at least one embodiment, feed pump 115 and water pump 105 can be diaphragm metering pumps.

Feed heater 120 and water heater 110 can be any type of exchangers capable of increasing the temperature of the respective fluid stream. In at least one embodiment, feed heater 120 can be a cross exchanger removing heat from another portion of the process to increase the temperature of pressurized oil 215. In at least one embodiment, water heater 110 can be a cross exchanger removing heat from another portion of the process to increase the temperature of pressurized water 205. In some embodiments, feed heater 120 and water heater 110 can be fluidly connected on the heat transfer medium side. That is the heat transfer medium used to heat feed heater 120 and water heater 110 can be from the same source.

Hot oil stream 220 and supercritical water stream 210 can be mixed in mixer 130 to produce mixed stream 230. The ratio of the volumetric flow rate of hot oil stream 220 to supercritical water stream 210 can be between 1:10 and 10:1 at standard temperature and pressure (SATP), and alternately between 1:5 and 5:1 at SATP. Mixer 130 can be any mixing device suitable for mixing a hydrocarbon stream with a water stream. Examples of mixer 130 can include an ultrasonic device and a tee fitting. Mixed stream 230 can be at a pressure at or greater than the critical pressure of water. Mixed stream 230 can be at a temperature in the range from between 200 deg C. to 500 deg C., alternately between 200 deg C. to 450 deg C., alternately in the range from between 320 deg C. and 450 deg C. The temperature of mixed stream 230 can depend on the temperatures of supercritical water stream 210 and hot oil stream 220.

In at least one embodiment of the integrated supercritical water and steam cracking process, mixed stream 230 can be introduced to furnace 310. In at least one embodiment, the entire volume of mixed stream 230 is introduced to convection section 312 of furnace 310. In at least one embodiment, a portion of mixed stream 230 is introduced to convection section 312 of furnace 310.

Reaction stage 190 includes convection section 312 of furnace 310 and supercritical reactor 140. Mixed stream 230 can be introduced to convection section 312 of furnace 310 and can be heated in convection section 312 by hot flue gas from radiation section 314 to produce convection upgraded stream 25. Convection section 312 can be designed to achieve a Reynolds number of at least 4000 of the streams in convection section 312. A Reynolds number of at least 4000 can ensure development of full turbulence. Full turbulence can increase mixing between the hydrocarbons and the supercritical water in mixed stream 230. Mixed stream 230 can undergo conversion reactions in convection section 312, such that hydrocarbons in mixed stream 230 undergo conversion reactions in the presence of supercritical water from mixed stream 230. Convection upgraded stream 25 can be at a temperature between the critical temperature of water and 650 deg C., alternately between the critical temperature of water and 500 deg C., alternately between the critical temperature of water and 450 deg C., and alternately between the critical temperature of water and 420 deg C. The pressure of convection section 312 can be between 2 bar (200 kPa) and 5 bar (500 kPa). The residence time of mixed stream 230 in convection section 312 can be less than 60 minutes, and alternately less than 30 minutes. The residence time of mixed stream 230 can be adjusted to limit the temperature of convection upgraded stream 25. The flow path of mixed stream 230 in convection section 312 can be in a downward path, and alternately can be in a horizontal path. In at least one embodiment, the flow path of mixed stream 230 is in the absence of an upflow path.

Advantageously, the presence of supercritical water in mixed stream 230 can suppress coke formation and formation of gas compounds compared to processes that use the convection section of a steam cracking furnace to preheat a feedstock or to thermal crack a feedstock in the absence of supercritical water. Examples of gas compounds can include methane, ethane, ethylene, propane, propylene, butanes, butenes, and combinations thereof.

In at least one embodiment, convection upgraded stream 25 can be introduced to supercritical reactor 140 to produce reactor effluent 240. The reaction conditions in supercritical reactor 140 can be maintained such that conversion reactions occur. The conversion reactions that occur in supercritical reactor 140 can be the same reactions that occur in convection section 312. Reaction conditions can include the temperature, pressure, and residence time. The temperature of supercritical reactor 140 can be greater than the critical temperature of water, alternately between 380 deg C. and 480 deg C., and alternately between 390 deg C. and 450 deg C. The pressure in supercritical reactor 140 can be greater than the critical pressure of water, alternately between 23 MPa and 35 MPa, and alternately between 24 MPa and 30 MPa. Pressure in supercritical reactor 140 can be controlled by depressurizing device 160. Supercritical reactor 140 can be a tubular type reactor. The residence time of supercritical reactor 140 can be between 10 seconds and 120 minutes, and alternately between 5 minutes and 30 minutes. In at least one embodiment, the residence time of supercritical reactor 140 is between 5 minutes and 30 minutes. Supercritical reactor 140 can be in the absence of an external supply of hydrogen. Supercritical reactor 140 can be in the absence of an external supply of catalyst.

Reactor effluent 240 can be introduced to post-reaction stage 200 to produce SCW-treated product 10.

Reactor effluent 240 is introduced to cooling device 150 to reduce the temperature of reactor effluent 240 to produce cooled effluent 250. Cooling device 150 can be one heat exchanger or a series of heat exchangers. In at least one embodiment, cooling device 150 includes a heat exchanger that can be used to heat pressurized water 205 by cross exchange with reactor effluent 240. In at least one embodiment, cooling device 150 can include one or more heat exchangers capable of removing heat from reactor effluent 240 to produce steam. Cooling device 150 can include any type of heat exchanger capable of decreasing the temperature of reactor effluent 240. In at least one embodiment, cooling device 150 can be a cross exchanger capable of removing heat from reactor effluent 240 to heat another stream.

Cooled effluent 250 can be depressurized in depressurizing device 160 to produce depressurized effluent 260. Depressurizing device 160 can be any device capable of reducing the pressure of cooled effluent 250. In at least one embodiment, depressurizing device 160 can be a back pressure regulator. In at least one embodiment, depressurizing device 160 can be a pressure control valve.

Depressurized effluent 260 is introduced to gas-liquid separator 170 to produce gas stream 270 and liquid stream 275. Gas stream 270 can contain hydrogen, hydrogen sulfide, methane, ethane, propane, ethylene, carbon monoxide, carbon dioxide, and combinations of the same. Liquid stream 275 is introduced to oil-water separator 180 to produce SCW-treated product 10 and produced water 285.

Produced water 285 can contain an amount of hydrocarbons. The amount of hydrocarbons in produced water 285 can be measured as total organic carbon (TOC). Hydrocarbons in produced water 285 means a loss of oil from SCW-treated product 10, therefore the TOC of produced water 285 can be less than 5 grams of organic carbon in 100 grams of water (0.5 wt %), alternately less than 0.1 wt %, and alternately less than 0.02 wt %. In at least one embodiment, the TOC in produced water 285 is less than 0.02 wt %.

The operating conditions of depressurizing device 160, gas-liquid separator 170, and oil-water separator 180 can be adjusted to control an amount of water in SCW-treated product 10. In at least one embodiment, the residence times in gas-liquid separator 170 and oil-water separator 180 can control the amount of water in SCW-treated product 10. In at least one embodiment, shorter residence times in gas-liquid separator 170 and oil-water separator 180 can increase the amount of water in SCW-treated product 10. In at least one embodiment, adding a demulsifier to liquid stream 275 can enhance the separation in oil-water separator 180 and can control the amount of water in SCW-treated product 10. In at least one embodiment, demulsifier can be added to liquid stream 275 in the range from 0.01 wt % to 0.1 wt % (weight of demulsifier to weight of liquid stream 275). In at least one embodiment, SCW-treated product 10 can contain an amount of water. The amount of water in SCW-treated product 10 can be less than 1 percent by weight (wt %) water, alternately less than 0.1 wt % of water (1,000 wt ppm), alternately less than 0.05 wt % (500 wt ppm), alternately less than 0.01 wt % (100 wt ppm), alternately between 0.03 wt % (300 ppm) and 0.1 wt % of water, and alternately between 0.03 wt % (300 ppm) and 1 wt % of water.

SCW-treated product 10 contains an upgraded oil. SCW-treated product 10 can include a distillable fraction, an atmospheric residue fraction, and a vacuum residue fraction. SCW-treated product 10 can have a paraffin concentration. SCW-treated product 10 can have an increased paraffin concentration by weight in the distillable fraction as compared to crude oil stream 2. In at least one embodiment, SCW-treated product 10 can have a reduced concentration of an atmospheric residue fraction as compared to the concentration of the atmospheric residue fraction in crude oil stream 2. In at least one embodiment, SCW-treated product 10 can have a reduced concentration of a vacuum residue fraction as compared to the concentration of the vacuum residue fraction in crude oil stream 2. In at least one embodiment, SCW-treated product 10 can include n-paraffins and α-olefins in the distillable fraction due to the cracking of alkyl-substituted aromatic compounds in convection section 312 and supercritical water reactor 140, where the alkyl-substituted aromatic compounds have alkyl groups with long chain paraffins attached to the aromatic cores. In at least one embodiment, SCW-treated product 10 has a decreased concentration of heteroatoms, such as sulfur compounds, nitrogen compounds, and metal compounds as compared to crude oil stream 2.

SCW-treated product 10 can be introduced to convection section 312 of furnace 310. The components of SCW-treated product 10 can mix with the diluent components from mixed stream 230 after it enters convection section 312. Components of SCW-treated product 10 can mix with the diluent components in radiation section 314 to produce furnace effluent 20. Furnace effluent 20 can include olefins.

The reactions in furnace 310 can include radical-mediated reactions that occur in the radiation section of furnace 310. At temperatures between 750 deg C. and 875 deg C., hydrocarbon molecules can be cracked to generate a radical. Through propagation of radicals, new molecules and radicals can be generated. In steam cracking, the low operating pressure and presence of steam as a diluent favor the production of light olefins.

Advantageously, SCW-treated product 10 is a water-in-oil emulsion, with the amount of water controlled by separation. Advantageously, the presence of emulsified water in SCW-treated product 10 can assist vaporization of hydrocarbons in furnace 310 because the emulsified water has a boiling point greater than 100 deg C. A boiling point greater than 100 deg C. of the emulsified water can be due to the pressure in furnace 310, the emulsified state of the water or both. The emulsified water stays in emulsion for longer resulting in thermal cracking of the hydrocarbons and suppression of coke formation.

Figure 2A:
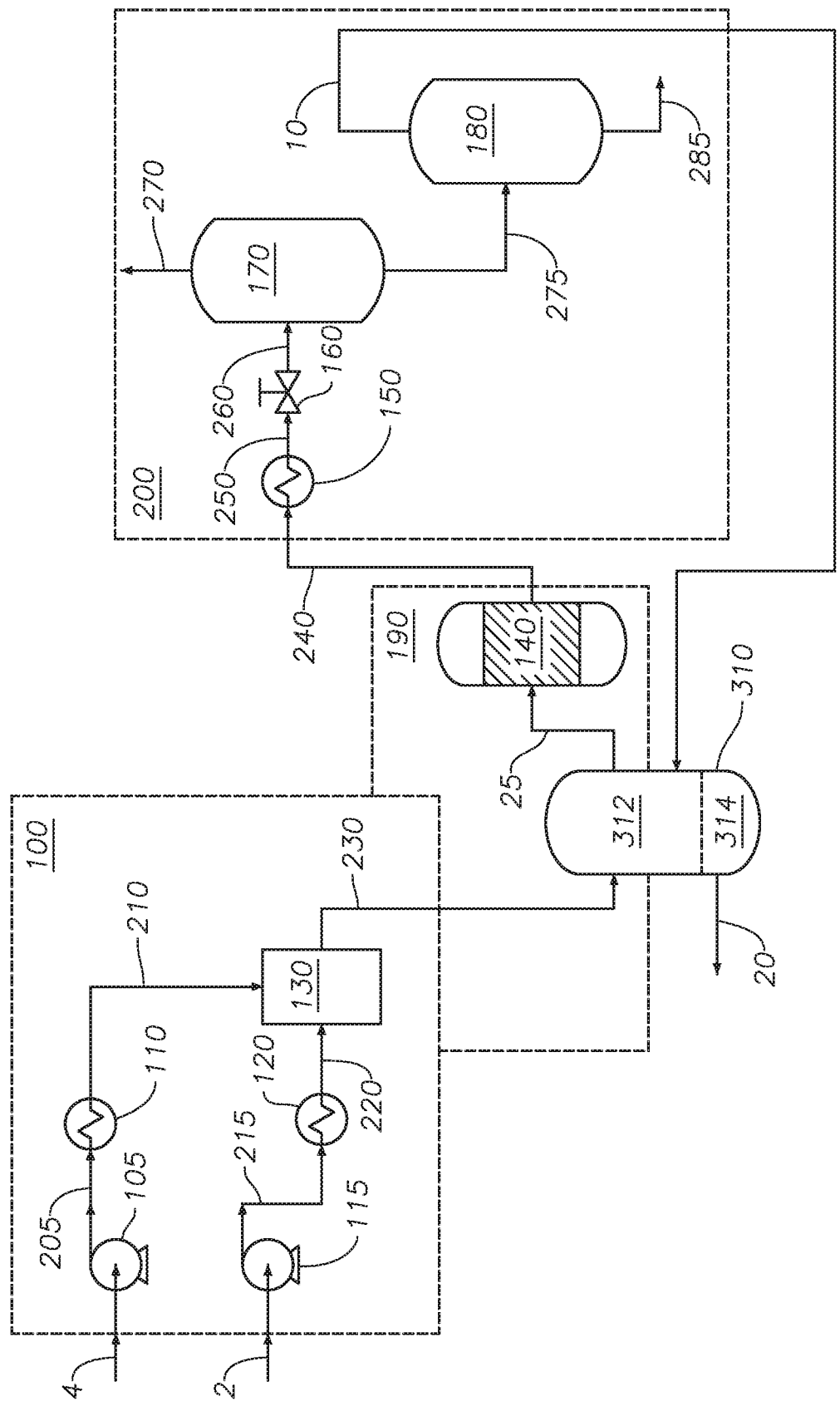
FIG. 2A provides a process diagram of an embodiment of an integrated process.
Figure 2B:
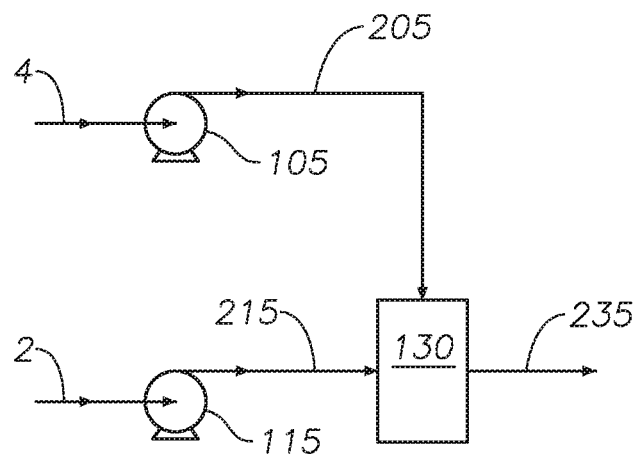
FIG. 2B provides a process diagram of an embodiment of an integrated process.

Referring to FIG. 2B with reference to FIG. 2A, an alternate embodiment of the integrated supercritical water and steam cracking process is provided. Pressurized oil 215 and pressurized water 205 can be mixed in mixer 130 to produced pressurized mix 235, a mixed stream. Pressurized mix 235 can be introduced to convection section 312 to produce convection upgraded stream 25.

Figure 3A:
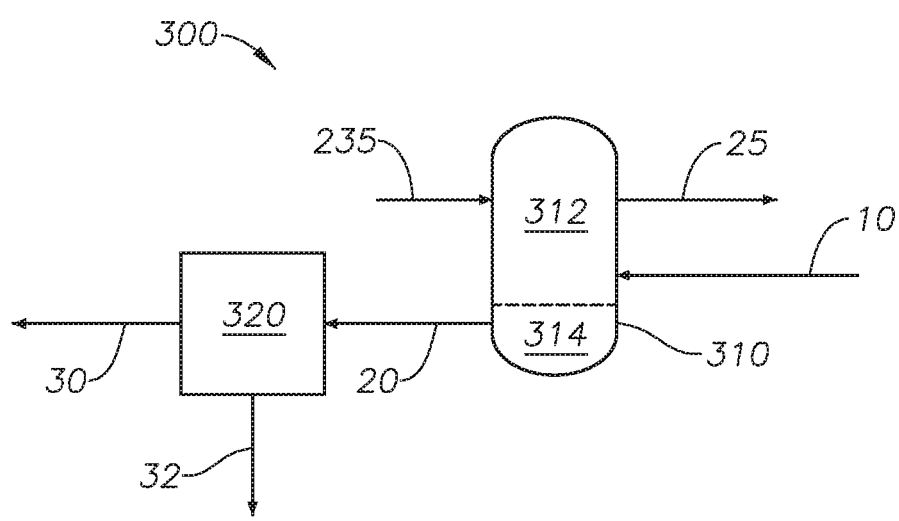
FIG. 3A provides a process diagram of an embodiment of an integrated process.

Referring to FIG. 3A with reference to FIG. 2A, a process flow diagram of a steam cracking process 300 is provided. Furnace 310 is a unit of steam cracking process 300. Furnace 310 produces furnace effluent 20, which can be introduced to cracker downstream unit 320. Furnace effluent 20 can contain a greater amount of light olefins, methane, acetylene, benzene, toluene, xylene, pyrolysis gasoline, pyrolysis fuel oil and other products as compared to crude oil stream 2. Other products can include coke.

Cracker downstream unit 320 can include operational units to further process furnace effluent 20, including further cracking units, heat recovery units, depressurization units, and separation units. Cracker downstream unit 320 can produce cracked product 30 and fuel oil 32. Cracked product 30 can include light olefins, methane, and ethane. Cracked product 30 has a greater amount of light olefins as compared to a product from a steam cracking process in the absence of being integrated with a supercritical water process. Fuel oil 32 can include pyrolysis fuel oil with a boiling point greater than 200 deg C., which can be an unstable and low quality hydrocarbon stream that is useful as a fuel oil. Fuel oil 32 can have a yield that is less than 30 wt % of the feed to steam cracking process 300. In at least one embodiment, fuel oil 32 can have a yield that is less than 30 wt % of SCW-treated product 10.

Figure 3B:
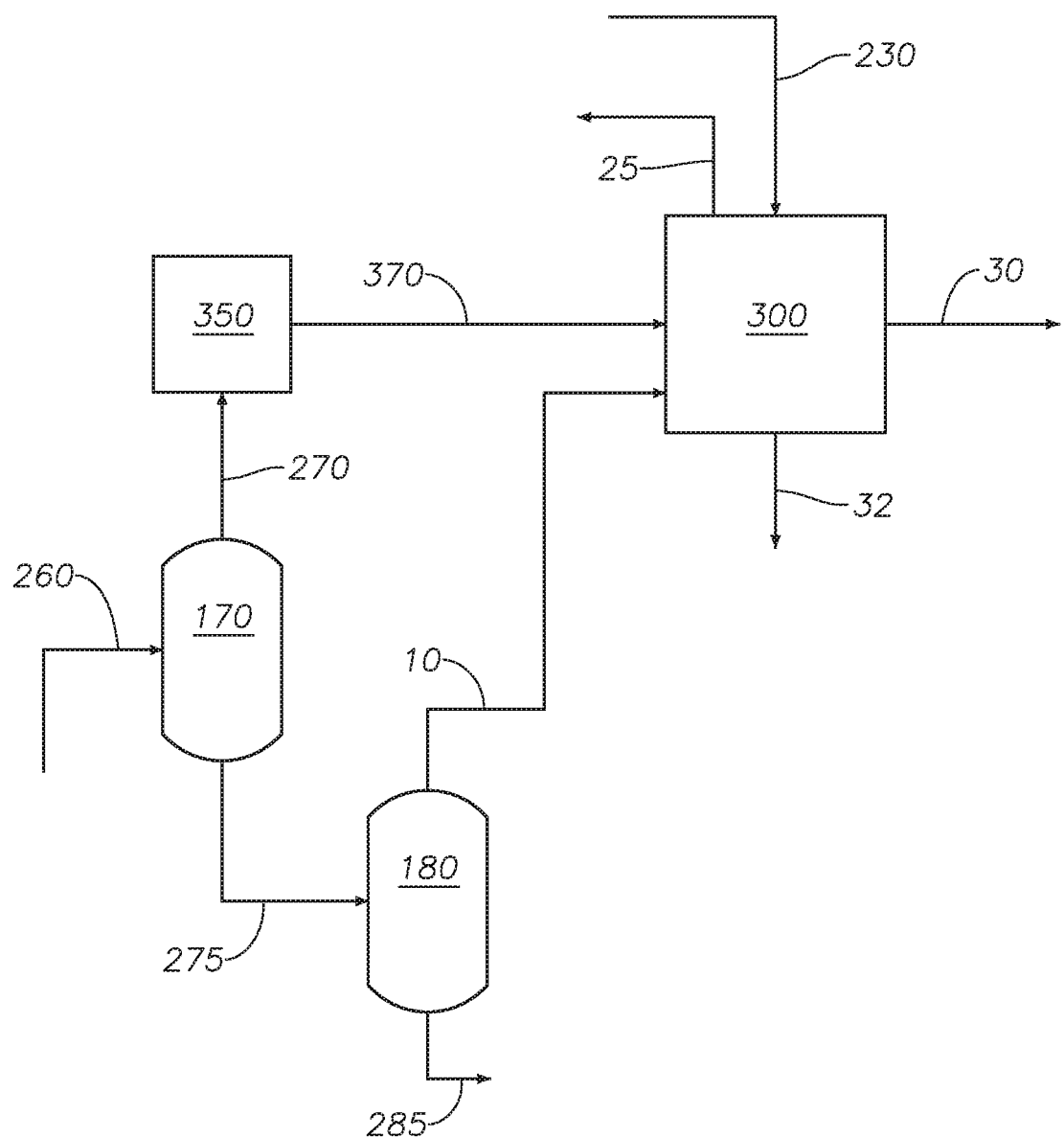
FIG. 3B provides a process diagram of an embodiment of an integrated process
FIG. 4 provides a process diagram of an embodiment of an integrated process.

In at least one embodiment, as shown in FIG. 3B, gas stream 270 can be introduced to sweetening process 350 to remove hydrogen sulfide from the stream to produced sweetened gas stream 370. Sweetening process 350 can be any type of unit capable of sweetening a gas phase stream by removing sulfur compounds. Examples of sweetening units can include the use of an alkaline solution. Sweetened gas stream 370 can be transferred to steam cracking process 300 as a feed or a fuel gas. Advantageously, sweetening process 350 enables use of the by-product gases from the supercritical water process for steam cracking. Sulfur compounds can reduce coke formation in steam cracker through passivation of the inner wall of the cracking coil. However, sulfur compounds also cause severe corrosion in the steam cracking zone as well as in downstream units, such as quenching process. Therefore, sweetening process 350 enables use of gas stream 270 in steam cracking process 300.

The composition of the crude oil stream can impact the composition of the SCW-treated product. The composition of the SCW-treated product can impact whether the SCW-product is suitable for treatment in the steam cracking process. In embodiments, where the composition of the SCW-treated product is not suitable for treatment in the steam cracking process, the SCW-treated product can be introduced to an intermediate unit to produce a product stream and the product stream can be introduced to the steam cracking process. The composition of the SCW-treated product is suitable for treatment in the steam cracking process when the concentration of the vacuum residue fraction in the SCW-treated product is less than 5 wt % and alternately less than 3 wt %. The concentration of the vacuum residue fraction can be measured using simulated distillation (SIMDIS), a common method described in ASTM D 7169. When the concentration of the vacuum residue fraction is greater than 5 wt %, severe coking can occur in a steam cracking process which can cause pressure drop throughout the steam cracking tubes and can inhibit heat transfer between the heat source, such as a flame, and the fluid in the steam cracking tubes. A buildup of coke on the steam cracking tubes can act as an insulator which disrupts the heat transfer process.

The combination of convection section 312 and supercritical reactor 140 can convert 80 wt % of the vacuum residue fraction in crude oil stream 2 to light fraction components, alternately 75 wt % of the vacuum residue fraction in crude oil stream 2 to light fraction components, and alternately at least 70 wt % of the vacuum residue fraction in crude oil stream 2 to light fraction components. In at least one embodiment, crude oil stream 2 contains a concentration of vacuum residue fraction of less than 20 wt % and the combination of convection section 312 and supercritical reactor 140 converts 75 wt % of the vacuum residue fraction in crude oil stream 2 to light fraction components resulting in SCW-treated product 10 containing less than 5 wt % vacuum residue fraction.

In embodiments where the composition of the SCW-treated product contains a concentration of the vacuum residue fraction of greater than 5 wt %, an intermediate unit can process the SCW-treated product to produce a product stream suitable for use in the steam cracking process. Examples of the intermediate unit can include a hydrotreating process, a distillation process, and a thermal conversion process. Advantageously, the intermediate unit can remove a portion of the vacuum residue fraction present in the SCW-treated product.

Figure 4:
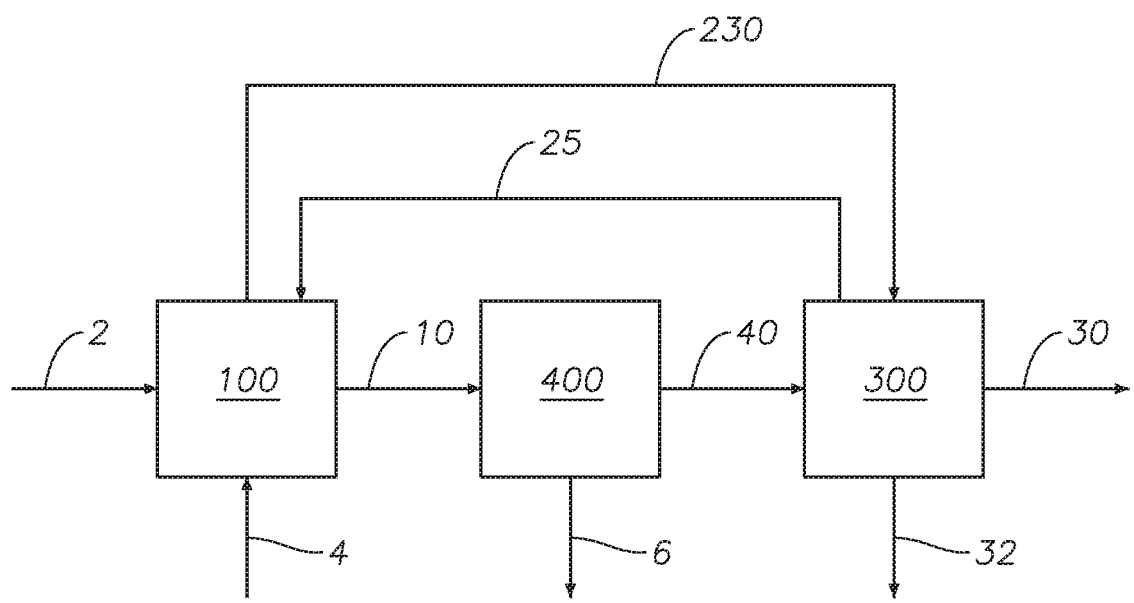

Referring to FIG. 4, with reference to FIG. 2A, an embodiment of an integrated supercritical water and steam cracking process with an intermediate unit is provided. SCW-treated product 10 is introduced to hydrotreating process 400. Hydrotreating process 400 can treat SCW-treated product 10 to produce hydrotreating process (HTP)-product 40. Hydrotreating process 400 advantageously can be used to process SCW-treated product 10 when the concentration of the vacuum residue fraction of crude oil stream 2 is greater than 20 wt % and the total sulfur content of crude oil stream 2 is greater than 1.5 wt % of sulfur. In at least one embodiment, the concentration of water in SCW-treated product 10 is less than 1,000 wt ppm, and alternately less than 100 wt ppm prior to being introduced to hydrotreating process 400. Advantageously, a concentration of water in SCW-treated product 10 of less than 1,000 wt ppm can limit deactivation of a hydrotreating catalyst by water.

Hydrogen gas stream 6 is introduced to hydrotreating process 400. Hydrogen gas stream 6 can be from any source of hydrogen gas. In at least one embodiment, hydrogen gas stream 6 can be recycled from steam cracking process 300, where hydrogen gas can be generated. The ratio of the flow rate of hydrogen gas stream 6 to the flow rate of SCW-treated product 10 can be between 100 cubic nanometers per kiloliter ($nm^3$/kL) and 800 $nm^3$/kL, and alternately between 200 $nm^3$/kL and 500 $nm^3$/kL.

Hydrotreating process 400 can contain a hydrotreating catalyst. The hydrotreating catalyst can be a cobalt-molybdenum (CoMo), nickel-molybdenum (NiMo), or any other catalyst known in the art. In hydrotreating process 400, hydrotreating reactions can occur such as hydrogenation, hydrodesulfurization, and hydronitrogenation. Hydrogenation reactions can hydrogenate unsaturated bonds, including of olefins. Hydrodesulfurization and hydronitrogenation reactions with hydrotreating catalyst can remove sulfur from compounds upgraded by the supercritical water process. The supercritical water process can convert large sulfur molecules into lighter sulfur molecules such as alkyl thiophenes and thiols. Lighter sulfur molecules can exhibit increased reactivity of sulfur compounds, such that sulfur can be removed more easily from lighter sulfur molecules.

Hydrotreating process 400 can include a hydrotreating reactor. The operating temperature of the hydrotreating reactor can be between 300 deg C. and 480 deg C. and alternately between 320 deg C. and 400 deg C. In the hydrotreating reactor, in the presence of the hydrotreating catalyst, unsaturated bonds of the hydrocarbons present in SCW-treated product 10 can be hydrogenated by hydrotreating. The olefin saturation reaction is exothermic and the operating temperature should be kept as low as possible. The operating pressure of the hydrotreating reactor can be between 3 MPa and 25 MPa, and alternately between 5 MPa and 15 MPa. The liquid hourly space velocity of the hydrotreating reactor can be between 0.1 per hour (/hr) and 2/hr, and alternately between 0.2/hr and 1/hr.

HTP-treated product 40 can be introduced to the furnace of steam cracking process 300. HTP-treated product 40 can be used a feedstock to the furnace for steam cracking. HTP-treated product 40 can have a boiling point range that is less than the boiling point range of SCW-treated product 10 due to hydrogenative and catalytic upgrading in hydrotreating process 400. The amount of heavy fractions in HTP-treated product 40 is less than the amount in SCW-treated product 10. The amount of impurities such as sulfur, nitrogen and metals in HTP-treated product 40 is less than the amount in SCW-treated product 10. The operating conditions, such as temperature and pressure, of HTP-treated product 40 can be adjusted based on the operating conditions of steam cracking process 300. In at least one embodiment, the temperature of HTP-treated product 40 can be in the range from about 10 deg C. to about 400 deg C. when entering steam cracking process 300. In at least one embodiment, the pressure of HTP-treated product 40 can be in the range from about 0.01 MPa to about 5 MPa when entering steam cracking process 300. In at least one embodiment, HTP-treated product 40 is reduce to a temperature between 30 deg C. and 90 deg C. and reduced to a pressure of ambient pressure. In at least one embodiment, a diluent stream is mixed with HTP-treated product 40 prior to being introduced to the furnace of steam cracking process 300. The diluent stream can be steam. Hydrotreating process 400 can include heat exchangers, depressurizing valves, and other process units that can adjust operating conditions downstream of the hydrotreating reactor.

Advantageously, the integrated supercritical water and steam cracking process can remove metallic compounds from crude oil stream 2, where the metallic compounds can be separated from the upgraded oil into the water. As result, SCW-treated product 10 contains a reduced metallic content as compared to crude oil stream 2. The reduced metallic content of SCW-treated product 10 results in a longer life for the hydrotreating catalyst in hydrotreating process 400 as compared to a conventional hydrotreating process treating crude oil.

Advantageously, the integrated supercritical water and steam cracking process can convert asphaltene to maltene without generating coke. Therefore, SCW-treated product 10 can have a reduced asphaltene concentration as compared to crude oil stream 2. Asphaltene is a known precursor for coke formation on a hydrotreating catalyst. Therefore, the reduced asphaltene results in a longer life for the hydrotreating catalyst in hydrotreating process 400 as compared to a conventional hydrotreating process treating crude oil.

Advantageously, treatment of crude oil by the integrated supercritical water and steam cracking process can relieve load to hydrotreating process 400 thus allowing for milder conditions in hydrotreating process 400 than would otherwise be expected in a hydrotreating process. As used here, "relieve load" means a reduced operating pressure in hydrotreating process, a reduced operating temperature in hydrotreating process, a shorter residence time in hydrotreating process, a longer catalyst life time in hydrotreating process, less production of light gases, such as methane and ethane in hydrotreating process, and reduced operating cost in hydrotreating process.

In at least one embodiment, fuel oil 32 can have a yield that is less than 30 wt % of HTP-treated product 40.

Figure 5:
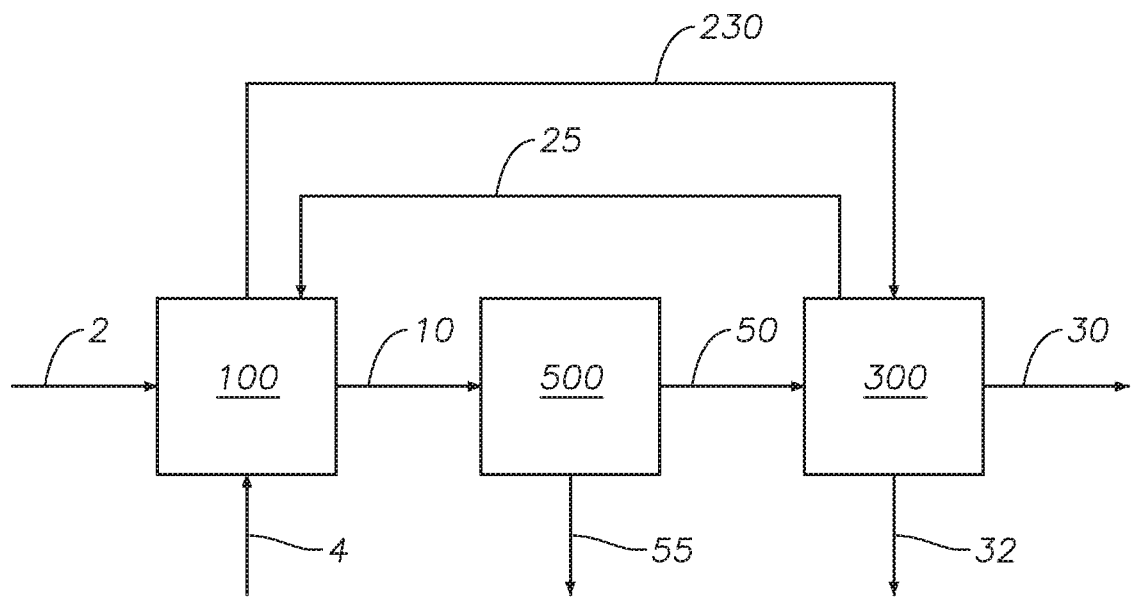
FIG. 5 provides a process diagram of an embodiment of an integrated process.

Referring to FIG. 5, with reference to FIG. 2A, an embodiment of an integrated supercritical water and steam cracking process with an intermediate unit is provided. SCW-treated product 10 is introduced to distillation process 500. Distillation process 500 can be any distillation process capable of separating streams. Examples of distillation process 500 include an atmospheric distillation unit, vacuum distillation unit, or a combination thereof. In at least one embodiment, distillation process 500 can include a distillation unit. Distillation process 500 can distill SCW-treated product 10 to produce distilled product 50 and distilled residue 55. Distilled product 50 can be introduced to the furnace of steam cracking process 300.

Distillation process 500 advantageously can be used to process SCW-treated product 10 when the concentration of the vacuum residue fraction of crude oil stream 2 is greater than 20 wt % or the concentration of the vacuum residue fraction of SCW-treated product 10 is greater than 5 wt %. Distillation process 500 can use steam as an energy carrier and diluent in the distillation unit. In at least one embodiment, the concentration of water in SCW-treated product 10 can be less than 1 pound per barrel (lb/barrel). In at least one embodiment, the concentration of water in SCW-treated product 10 can be less than 0.3 wt %.

The cut point of distillation of distillation process 500 can be selected based on the specifications of steam cracking process 300. As used here, "cut point" refers to the final boiling point of distillates. The cut point of distillation of distillation process 500 can be between 650 deg F. and 1050 deg F., alternately between 850 deg F. and 1050 deg F. In at least one embodiment, the cut point of distillation of distillation process 500 can be designed to remove or eliminate the vacuum residue fraction from distilled product 50. In at least one embodiment, the cut point of distillation process 500 is between 850 deg F. and 1050 deg F. The greater the cut point of distillation, the greater the volume of distilled product 50 that can be directed toward steam cracking process 300; however, coke formation can be increased due to a shorter run length. Increased coke formation can lead to a requirement for decoking. The cut point of distillation can be determined in consideration of steam cracking process 300 and available decoking processes.

Distilled residue 55 can contain the fraction separated by the cut point. In at least one embodiment, distilled residue 55 can be recycled to the front end of the integrated supercritical water and steam cracking process and can be mixed with crude oil 2. In at least one embodiment, distilled residue 55 can be combined with fuel oil 32. In at least one embodiment, fuel oil 32 can have a yield that is less than 30 wt % of distilled product 50.

Figure 5A:
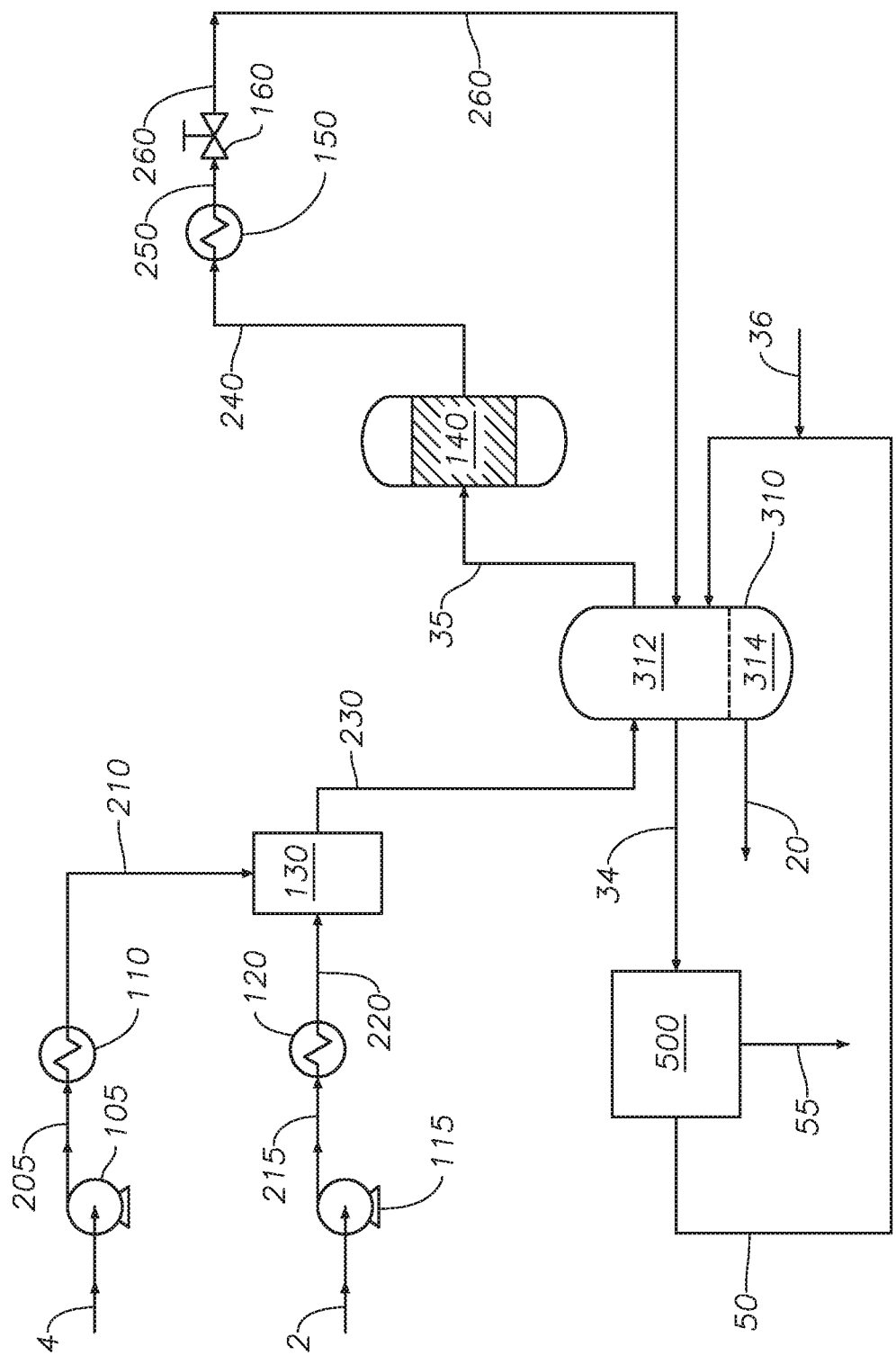
FIG. 5A provides a process diagram of an embodiment of an integrated process.

Referring to FIG. 5A, with reference to FIG. 2A, an embodiment of an integrated supercritical water and steam cracking process with distillation process 500 is provided. Depressurized effluent 260 can be introduced to convection section 312. Depressurized effluent 260 can be at a pressure between 1 pounds per square inch (psig) and 200 psig. Depressurized effluent 260 can be at a temperature of less than the critical temperature of water. Cooling of depressurized effluent 260 can be due to pressure letdown without additional temperature reducing device. Depressurized effluent 260 is an emulsion and can be heated by passing through convection section 312 to produce heated emulsion 34. Heated emulsion 34 can be at the same pressure as depressurized effluent 260. Heated emulsion 34 can be at a temperature between 350 deg C. and 600 deg C. The temperature of heated emulsion 34 can be adjusted based on the cut point of distillation in distillation process 500. Heated emulsion 34 can be introduced to distillation process 500 to produce distilled product 50 and distilled residue 55.

Distilled residue 55 can contain dirty water. The dirty water can include water and metal compounds.

Distilled product 50 can contain the majority of water present in heated emulsion 34. Distilled product 50 can be introduced to convection section 312 of furnace 310. Diluent stream 36 can be mixed with distilled product 50 before being added to convection section 312. Diluent stream 36 can include water at a temperature and pressure such that the water is present in diluent stream 36 as steam. The steam to oil ratio for furnace 310 can be between 0.4 kilogram-steam per kilogram-oil (kg-steam/kg-oil) and 1.0 kg-steam/kg-oil. In general the heavier the feed, the greater the volume of steam to be included in furnace 310. In at least one embodiment, the water concentration in distilled product 50 can be measured and the volume of diluent stream 36 can be adjusted based on the measured amount of water in distilled product 50. Advantageously, introducing depressurized effluent 260 to convection section 312 and using distillation process 500 to separate distilled product 50, can reduce the amount of diluent stream 36 used in convection section 312.

Figure 6:
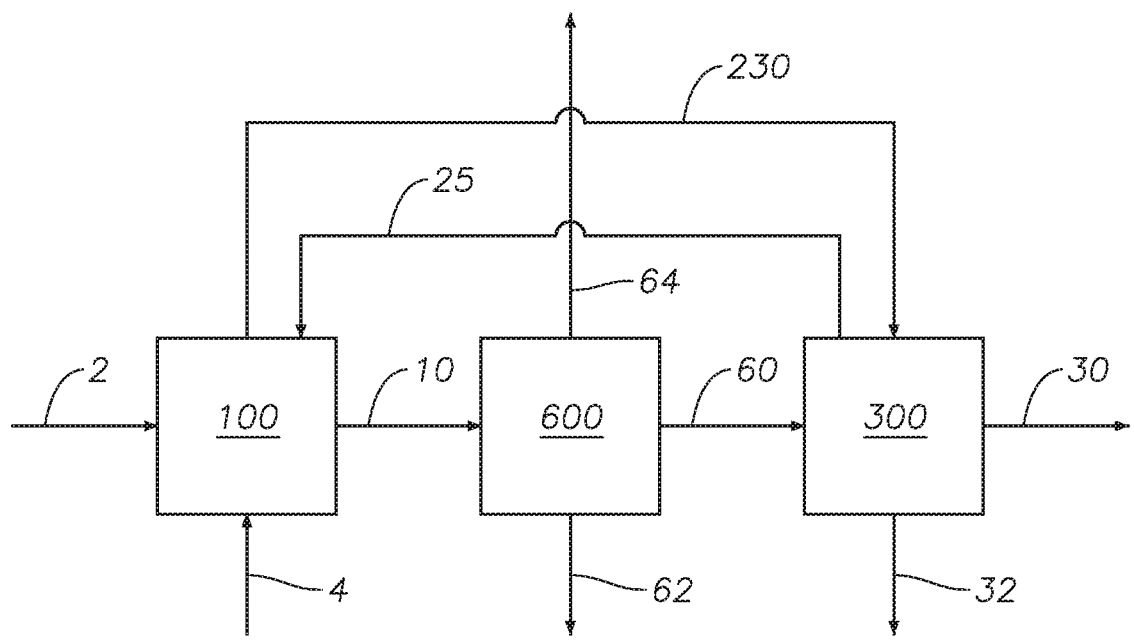
FIG. 6 provides a process diagram of an embodiment of an integrated process.

Referring to FIG. 6, an embodiment of an integrated supercritical water and steam cracking process with an intermediate unit is provided. SCW-treated product 10 is introduced to thermal conversion process 600. Thermal conversion process 600 can include a coking process and a visbreaking process. Coking processes can include a delayed coker process and a fluid coker process. A visbreaking process can operate at a temperature between 450 deg C. and 500 deg C., a pressure between 1 MPa and 2.5 MPa, and a residence time between 1 minute and 20 minutes. A delayed coker process can operate at a temperature between 410 deg C. and 470 deg C., a pressure between 0.04 MPa and 0.17 MPa, and a residence time between 5 hours and 20 hours. A fluid coker process can operate at a temperature between 480 deg C. and 560 deg C., a pressure at ambient pressure, and a residence time between 5 seconds and 20 seconds.

Thermal conversion process 600 converts the upgraded oil in SCW-treated product 10 to produce thermal liquid product 60, coke 62, and thermal gas product 64. In at least one embodiment, thermal conversion process 600 can be a delayed coker. Thermal liquid product 60 contains less than 5 wt % vacuum residue fraction. Coke 62 can contain solid coke, pitch, heavy molecules such as asphaltenes, and combinations of the same. Thermal gas product 64 can include methane, ethane, ethylene, propane, propylene, hydrogen sulfide, other light molecules, and combinations of the same. Thermal liquid product 60 can be introduced to steam cracking process 300.

Thermal conversion process 600 advantageously can be used to process SCW-treated product 10 when the vacuum residue fraction of crude oil stream 2 is greater than 20 wt % or the vacuum residue fraction of SCW-treated product 10 is greater than 5 wt %. In at least one embodiment, the concentration of water in SCW-treated product 10 can be less than 20 wt % prior to entering thermal conversion process 600. The amount of water in SCW-treated product 10 can be adjusted based on the process design of thermal conversion process 600, the energy demands, and the desired product composition. The amount of water in SCW-treated product 10 can reduce coke generation, by generating hydrogen through reforming and due to the water-gas shift reaction. The amount of water in SCW-treated product 10 can increase liquid product yield in thermal conversion process 600.

In certain embodiments, when thermal liquid product 60 contains a concentration of vacuum residue fraction of greater than 5 wt %, thermal liquid product 60 can be processed in another unit such as a distillation or fractionation unit to remove the vacuum residue fraction and therefore reduce the concentration of vacuum residue fraction to less than 5 wt % prior to being introduced to steam cracking process 300.

Thermal gas product 64 can be introduced to steam cracking process 300 (not shown) as a feed or as a fuel.

While the embodiments here have been described with reference to the integrated supercritical water and steam cracking process described with reference to FIG. 2A, it is understood that the embodiments of a supercritical water and steam cracking process with an intermediate unit could also be employed with reference to the integrated supercritical water and steam cracking process described with reference to FIG. 2B.

Embodiments of an integrated supercritical water and steam cracking process are in the absence of a delayed coker. A delayed coker can produce large amounts of solid coke which is problematic for a steam cracking process. In addition, a delayed coker can produce a large amount of gases such as methane and ethane, which can include hydrogen. A supercritical water process can produce less gas than a delayed coker thus keeping more hydrogen in the liquid hydrocarbon product. This means that the liquid product from a delayed coker has a lesser hydrogen to carbon ratio than a liquid product from a supercritical water process. In addition, a supercritical water process can produce less coke than a delayed coker.

EXAMPLES

Example 1

Example 1 contains Aspen HYSYS® simulations from Aspen Technology, Inc. Bedford, Mass. illustrating the integration of the convection section of the furnace to the supercritical water process. In a first simulation, with reference to FIG. 7 and FIG. 2A, water stream 4 was simulated as a demineralized water with a conductivity of less than 0.1 μS/cm. The composition of crude oil stream 2 is shown in Table 1. Pressurized water 205 is pre-heated by cross-exchange with cooling device 150 to produce pre-heated water 705. Pre-heated water 705 is heated in water heater 110 to produce supercritical water stream 210.

Mixed stream 230 is introduced to supercritical reactor 140. Reactions occur in supercritical reactor 140 with a residence time of less than 15 minutes.

Supercritical reactor 140 was simulated as a tubular-type reactor to give residence time to the mixed stream of at least 15 minute. Depressurized effluent 260 is introduced to gas-liquid separator 170, which produced vapor stream 770 and liquid stream 275. Vapor stream 770 is introduced to vapor separator 700, which produced gas stream 270 and separated liquid 775. Liquid stream 275 and separated liquid 775 are introduced to oil-water separator 180 to produce SCW-treated product 10 and produced water 285.

The properties of SCW-treated product 10 are in Table 1. Operating conditions of the streams are in Table 2.

Table 1 provides the properties of the streams.

TABLE 1

Stream properties for Example 1.

| Properties | Stream 2 | Stream 10 |
| --- | --- | --- |
| Specific Gravity (API) | 28.2 | 34.2 |
| TBP 5% (deg C.) | 41 | 35 |
| TBP 10% (deg C.) | 92 | 98 |
| TBP 30% (deg C.) | 234 | 215 |
| TBP 50% (deg C.) | 363 | 337 |
| TBP 70% (deg C.) | 524 | 453 |
| TBP 90% (deg C.) | 745 | 596 |
| TBP 95% (deg C.) | 819 | 634 |
| Sulfur Content (wt %) | 2.9 | 2.7 |
| Nitrogen Content (wt ppm) | 1536 | 925 |
| Kinematic Viscosity at 100 deg F. (centistokes (cSt)) | 16.7 | 1.5 |

TABLE 2

Figure 7:
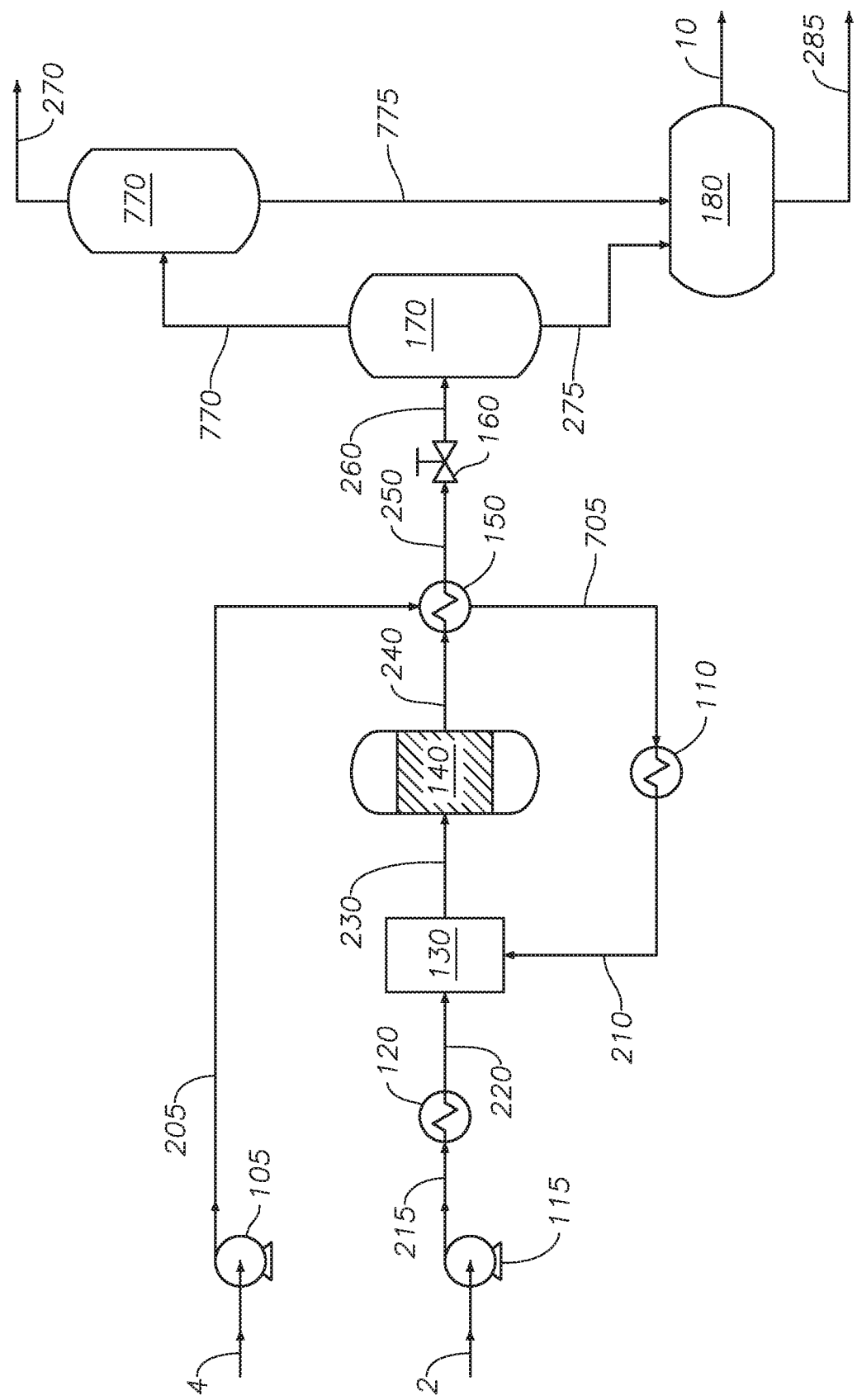
FIG. 7 provides a process diagram of an embodiment of an integrated process.

Operating Conditions of the Simulation according to FIG. 7

| Stream | Temperature (deg C.) | Pressure (psig) | Mass Flow (kilograms per hour (kg/h)) | Liquid Volume Flow (barrel/day) |
| --- | --- | --- | --- | --- |
| Stream 4 | 20 | 1 | 661.1 | 100.00 |
| Stream 205 | 22 | 3901 | 661.1 | 100.00 |

TABLE 2-continued

Operating Conditions of the Simulation according to FIG. 7

| Stream | Temperature (deg C.) | Pressure (psig) | Mass Flow (kilograms per hour (kg/h)) | Liquid Volume Flow (barrel/day) |
|---|---|---|---|---|
| Stream 705 | 337 | 3901 | 661.1 | 100.00 |
| Stream 210 | 400 | 3901 | 661.1 | 100.00 |
| Stream 2 | 20 | 1 | 600.0 | 100.00 |
| Stream 215 | 21 | 3901 | 600.0 | 100.00 |
| Stream 220 | 150 | 3901 | 600.0 | 100.00 |
| Stream 230 | 368 | 3901 | 1261.1 | 200.00 |
| Stream 240 | 450 | 3901 | 1261.1 | 206.3 |
| Stream 250 | 150 | 3901 | 1261.1 | 206.3 |
| Stream 260 | 153 | 100 | 120.0 | 206.3 |
| Stream 270 | 50 | 1 | 0.6 | 0.1 |
| Stream 285 | 50 | 1 | 661.0 | 100.0 |
| Stream 10 | 50 | 1 | 599.5 | 106.2 |

Figure 8:
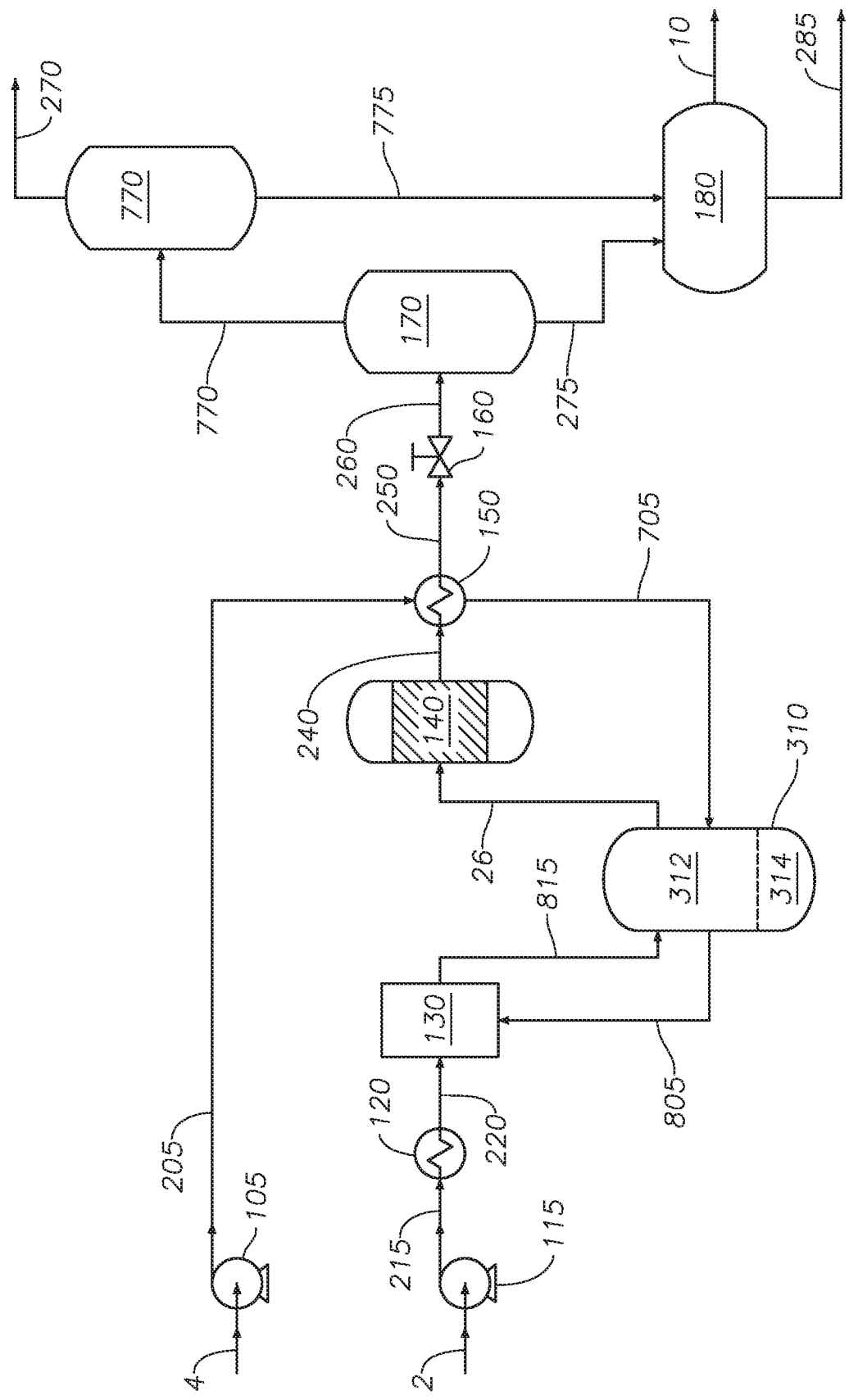
FIG. 8 provides a process diagram of an embodiment of an integrated process.

In a second simulation, with reference to FIG. 2A, FIG. 7, and FIG. 8, pre-heated water 705 is introduced to convection section 312 of furnace 310 to produce heated water 805. Therefore, the embodiment of the process as shown in FIG. 8 is in the absence of water heater 110. Heated water 805 is mixed with hot oil 220 in mixer 130 to produce mixed feed 815. Mixed feed 815 can have the same operating conditions as described with reference to mixed stream 230. Mixed feed 815 is introduced to convection section 312 of furnace 310 where the hydrocarbons present in mixed feed 815 undergo conversion reactions in the presence of supercritical water in convection section 312. Convection section 312 is simulated to provide a Reynolds number of 4000 in convection section 312. Table 3 contains those streams that are not already disclosed in Table 2.

TABLE 3

Operating Conditions of the Simulation according to FIG. 8

| Stream | Temperature (deg C.) | Pressure (psig) | Mass Flow (kilograms per hour (kg/h)) | Liquid Volume Flow (barrel/day) |
|---|---|---|---|---|
| Stream 15 | 364 | 3901 | 1261.1 | 200.0 |
| Stream 25 | 416 | 3901 | 1261.1 | 200.0 |
| Stream 240 | 450 | 3901 | 1261.1 | 206.3 |
| Stream 250 | 150 | 3901 | 1261.1 | 206.3 |
| Stream 260 | 153 | 100 | 1261.1 | 206.3 |
| Stream 270 | 50 | 1 | 0.6 | 0.1 |
| Stream 285 | 50 | 1 | 661.0 | 100.0 |
| Stream 10 | 50 | 1 | 599.5 | 106.2 |

TABLE 4

Stream properties for Example 1.

| Properties | FIG. 7 Stream 10 | FIG. 8 Stream 10 |
|---|---|---|
| Specific Gravity (API) | 34.2 | 34.4 |
| TBP 5% (deg C.) | 35 | 35 |
| TBP 10% (deg C.) | 98 | 99 |
| TBP 30% (deg C.) | 215 | 184 |
| TBP 50% (deg C.) | 337 | 262 |
| TBP 70% (deg C.) | 453 | 418 |
| TBP 90% (deg C.) | 596 | 543 |
| TBP 95% (deg C.) | 634 | 611 |
| Sulfur Content (wt %) | 2.7 | 2.6 |
| Nitrogen Content (wt ppm) | 925 | 895 |
| Kinematic Viscosity at 100 F. (cSt) | 1.5 | 1.4 |

TABLE 4-continued

Stream properties for Example 1.

The results in Table 4 show that passing the mixed feed through the convection section of a furnace produces a SCW-treated product (FIG. 8 stream 10) that is of better quality than the SCW-treated product from a supercritical water process that does not integrate a steam cracker (FIG. 7 stream 10). The longer exposure of the stream to hot temperatures increases the amount of hydrocarbons that undergo conversion reactions, resulting in more light fractions.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A system for upgrading a crude oil stream, the system comprising:
   a pre-reaction stage configured to produce a mixed stream from the crude oil stream and a water stream, the pre-reaction stage comprising a feed pump, a feed heater, a water pump, a water heater, and a mixer;
   a reaction stage fluidly connected to the pre-reaction stage, the reaction stage comprising:
      a convection section of a furnace fluidly connected to the pre-reaction stage, the convection section of the furnace configured to mix the mixed stream and a first fraction of components of a supercritical water (SCW)-treated product to undergo conversion reactions to produce a convection upgraded stream, wherein the convection upgraded stream is at a temperature between the critical temperature of water and 500° C., a supercritical reactor fluidly connected to the convection section of the furnace, wherein the supercritical reactor is configured to subject the convection upgraded stream to one or more conversion reactions to produce a reactor effluent, wherein the supercritical reactor is maintained at a temperature between 380° C. and 450° C. and a pressure between 23 MPa and 35 MPa, a radiation section of the furnace fluidly connected to the convection section of the furnace, wherein the radiation section is configured to receive a second fraction of components of the SCW-treated product from the convection section of the furnace and upgrade the second fraction of components of the SCW-treated product and diluents to produce a furnace effluent, where the second fraction of components of the SCW-treated product flow from the convection section of the furnace to the radiation section of the furnace, where the second fraction of components of the SCW-treated product are subject to radical-mediated reactions; and a post-reaction stage fluidly connected to the reaction stage, the post-reaction stage configured to separate the reactor effluent to produce the supercritical water (SCW)-treated product such that the SCW-treated product is introduced to the convection section of the furnace, wherein the SCW-treated product comprises an increased paraffin concentration as compared to the crude oil stream, wherein the SCW-treated product comprises an amount of water.

2. The system of claim 1, wherein the post-reaction stage is configured to adjust the amount of water in the SCW-treated product.

3. The system of claim 1, further comprising an intermediate unit fluidly connected to the post-reaction stage, the intermediate unit configured to produce a product stream.

4. The system of claim 3, wherein the intermediate unit is selected from the group consisting of a hydrotreating process, a distillation process, and a thermal conversion process.

5. The system of claim 3, wherein the intermediate unit is a hydrotreating process and wherein the product stream is a hydrotreating process (HTP)-product.

6. The system of claim 5, wherein the crude oil stream comprises a concentration of a vacuum residue fraction that is greater than 20 wt %, wherein the crude oil stream comprises a total sulfur content that is greater than 1.5 wt % sulfur.

7. The system of claim 5, wherein the amount of water in the SCW-treated product is less than 1,000 wt ppm.

8. The system of claim 3, wherein the intermediate unit is a distillation process, further wherein the product stream is a distilled product.

9. The system of claim 8, wherein the distillation process is selected from the group consisting of an atmospheric distillation unit, a vacuum distillation unit, and a combination thereof.

10. The system of claim 7, wherein the crude oil stream comprises a vacuum residue fraction that is greater than 20 wt %.

11. The system of claim 8, wherein the SCW-treated product comprises a concentration of a vacuum residue fraction that is greater than 20 wt %.

12. The system of claim 8, wherein a cut point of distillation of the distillation process is between 650° F. and 1050° F.

13. The system of claim 3, wherein the intermediate unit is a thermal conversion process, further wherein the product stream is a thermal liquid product.

14. The system of claim 13, wherein the thermal conversion process is selected from the group consisting of a coking process and a visbreaking process.

15. The system of claim 13, wherein the crude oil stream comprises a concentration of a vacuum residue fraction that is greater than 20 wt %.

16. The system of claim 13, wherein the thermal liquid product comprises a concentration of a vacuum residue fraction that is less than 5 wt %.

17. The system of claim 1, wherein:

the feed pump is configured to increase a pressure of the crude oil stream to produce a pressurized oil, wherein the pressurized oil is at a pressure at or greater than the critical pressure of water;

the feed heater fluidly connected to the feed pump, the feed heater configured to heat the pressurized oil to a temperature at or less than 150° C. to produce a hot oil stream;

the water pump configured to increase a pressure of water stream to a pressure at or greater than the critical pressure of water to produce a pressurized water;

the water heater fluidly connected to the water pump, the water heater configured to heat the pressurized water to a temperature at or greater than the critical temperature of water to produce a supercritical water stream; and the mixer fluidly connected to the feed heater and the water heater, the mixer configured to mix the hot oil stream and the supercritical water stream to produce the mixed stream.

18. The system of claim 1, wherein the convection section of the furnace operates at a pressure between 2 bar and 5 bar and wherein the radiation section of the furnace operates at pressure between 2 bar and 5 bar.

* * * * *